United States Patent [19]
Rigdon et al.

[11] Patent Number: 6,066,833
[45] Date of Patent: May 23, 2000

[54] APPARATUS AND METHOD FOR SELECTIVELY CHANGING WELDING WIRE

[75] Inventors: James E. Rigdon, Cuba, Ala.; Norman V. Hill, Laurel, Miss.

[73] Assignee: Howard Industries, Laurel, Miss.

[21] Appl. No.: 09/124,806

[22] Filed: Jul. 29, 1998

[51] Int. Cl.[7] ........................... B23K 9/28
[52] U.S. Cl. ................... 219/137.2; 219/137.7
[58] Field of Search ............... 219/137.2, 137.7

[56] References Cited

U.S. PATENT DOCUMENTS

| | | | |
|---|---|---|---|
| 3,694,620 | 9/1972 | Gleason | 290/130 |
| 5,249,209 | 9/1993 | Kwech | 376/260 |

FOREIGN PATENT DOCUMENTS

| | | |
|---|---|---|
| 55-036066 | 3/1980 | Japan . |
| 56-168967 | 12/1981 | Japan . |
| 57-1000870 | 6/1982 | Japan . |
| 69-066975 | 4/1984 | Japan . |
| 63-233067 | 9/1988 | Japan . |

*Primary Examiner*—Patrick Ryan
*Assistant Examiner*—Anjan Dey
*Attorney, Agent, or Firm*—Townsend and Townsend and Crew

[57] ABSTRACT

An apparatus for selecting a consumable welding wire from a plurality of consumable welding wires. The apparatus has a base, and a drive wheel rotatably supported by the base for engaging a consumable welding wire. A plurality of pinch-roller arms is pivotally secured to the base, and a plurality of pinch rollers is rotatably secured to the plurality of pinch-roller arms. The apparatus also includes a plurality of spring assemblies supported by the base for biasing the plurality of pinch-roller arms. A plurality of pneumatic cylinder assemblies engage the base and the pinch-roller arms for moving the pinch-roller arms relative to the base. A method for selecting any one of a plurality of consumable welding wires comprising pivoting a pinch-roller assembly to cause a rotatable pinch roller to engage and hold a consumable welding wire in driving engagement with a rotatable drive wheel.

36 Claims, 19 Drawing Sheets

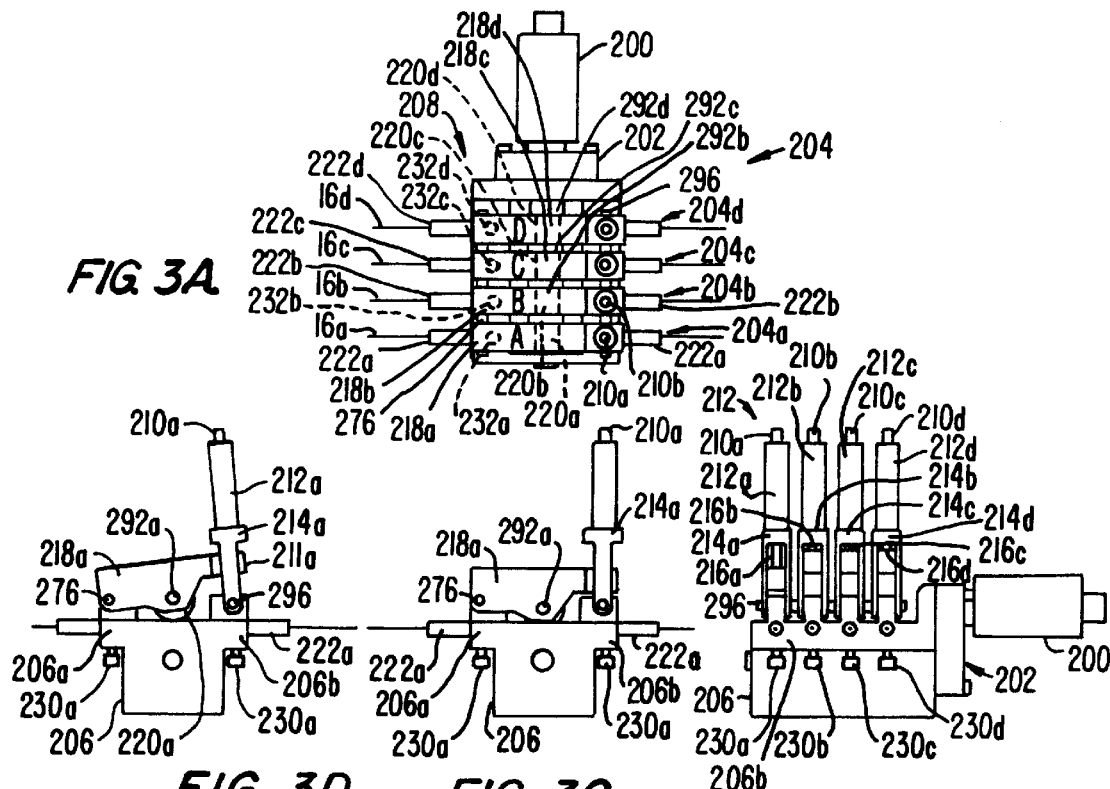
FIG. 3A.
FIG. 3B.
FIG. 3C.
FIG. 3D.
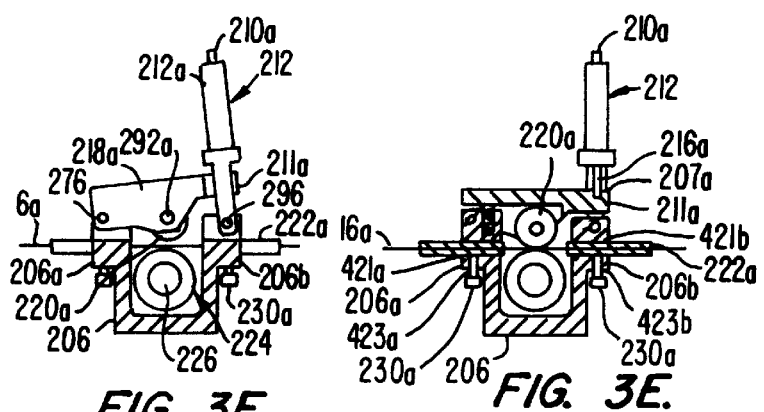
FIG. 3E.
FIG. 3F.
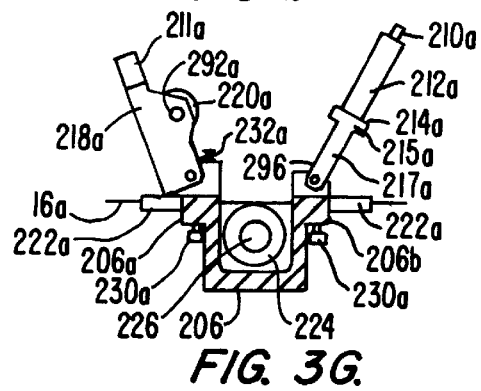
FIG. 3G.

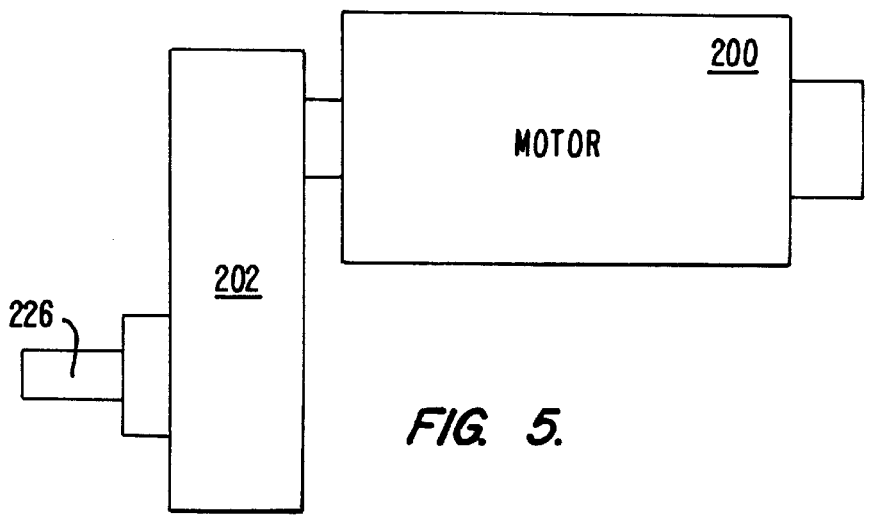
FIG. 5.
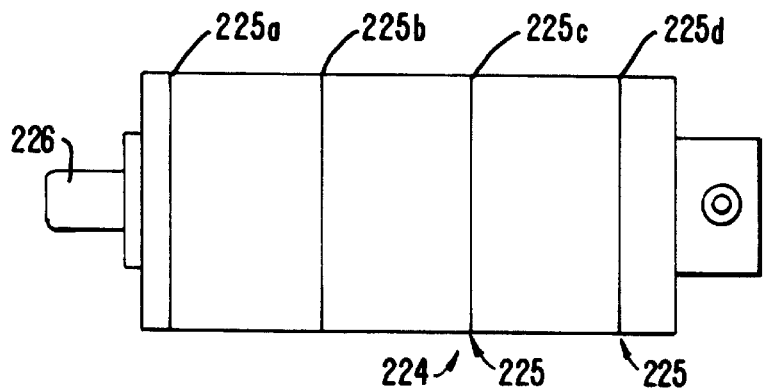
FIG. 6.
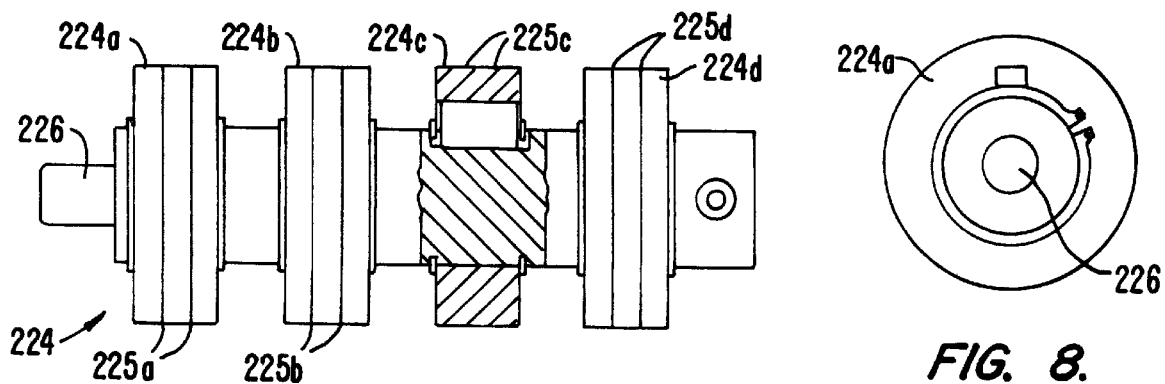
FIG. 7.
FIG. 8.

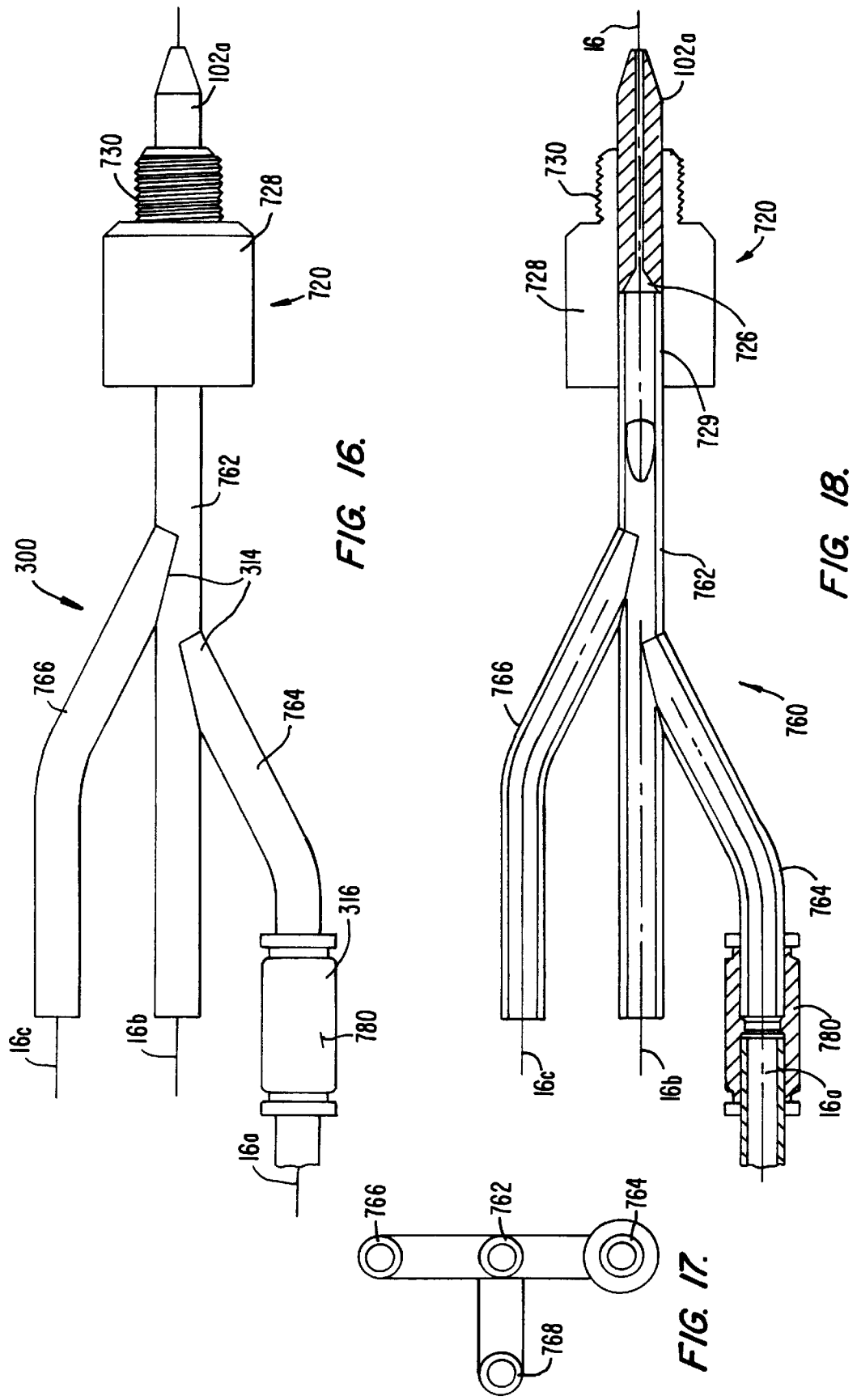

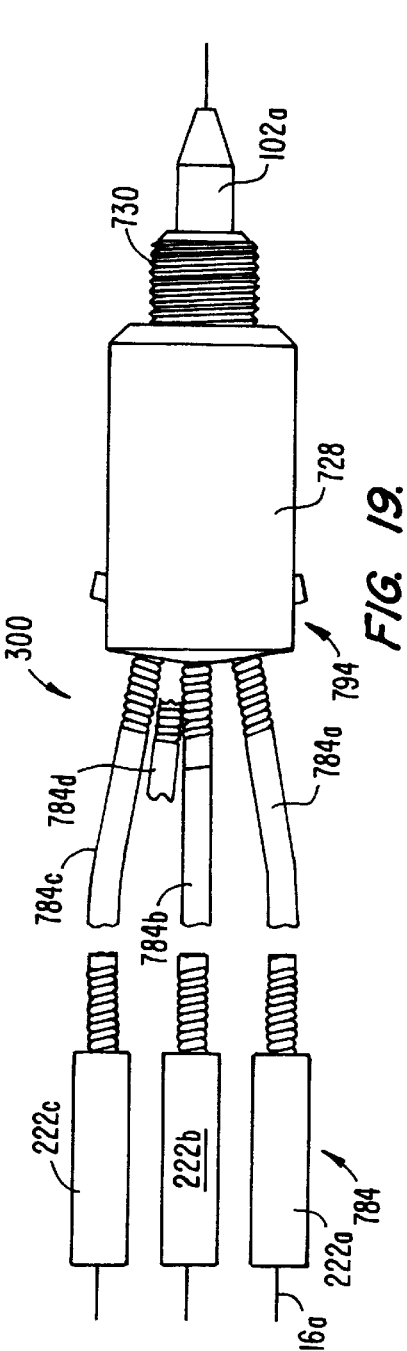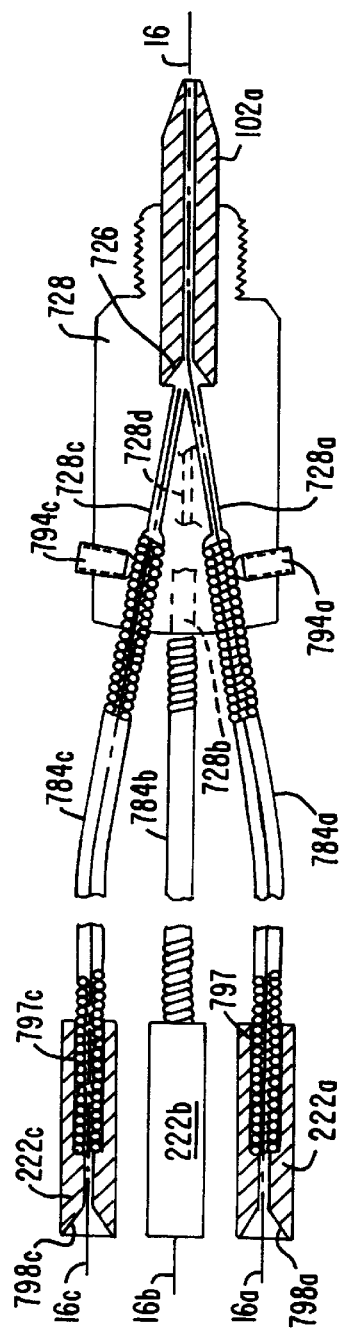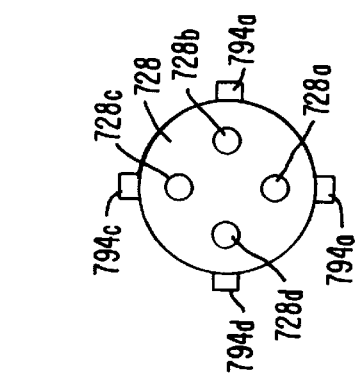

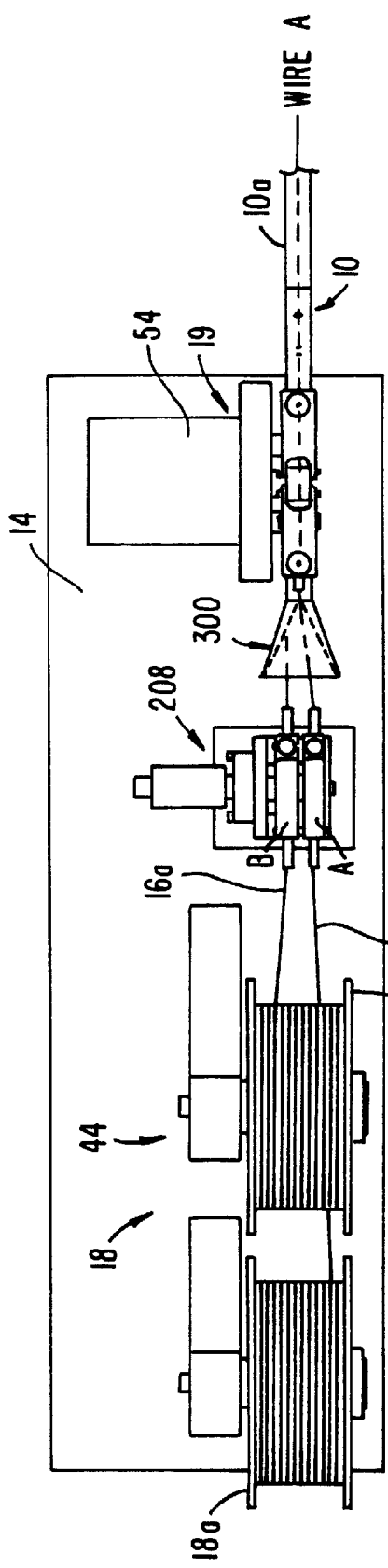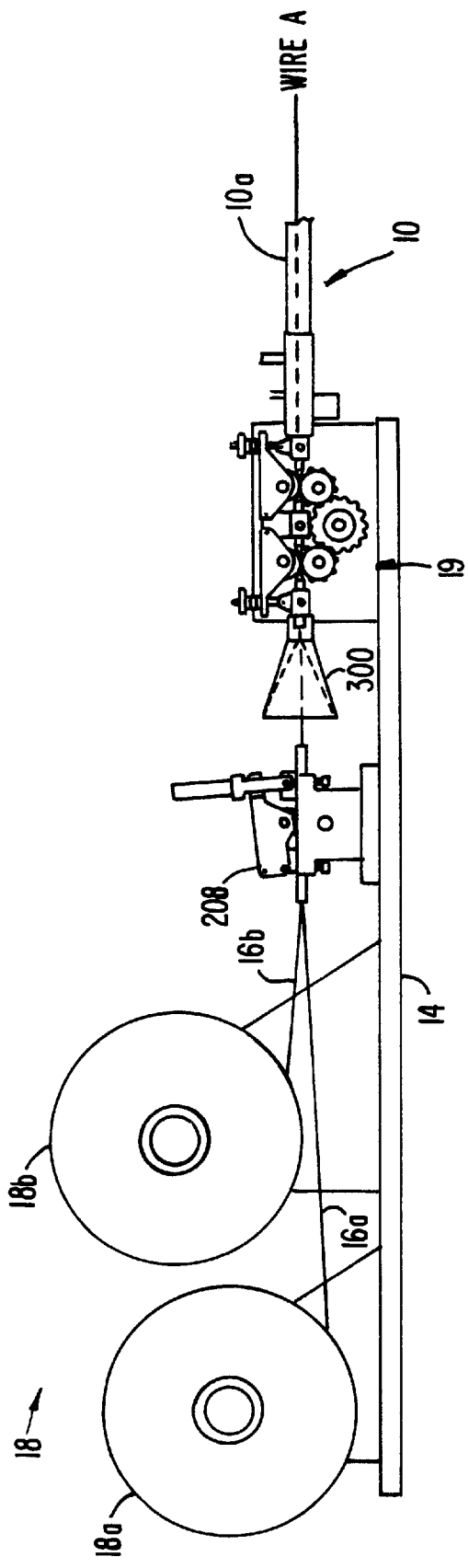
FIG. 22A.
FIG. 22B.

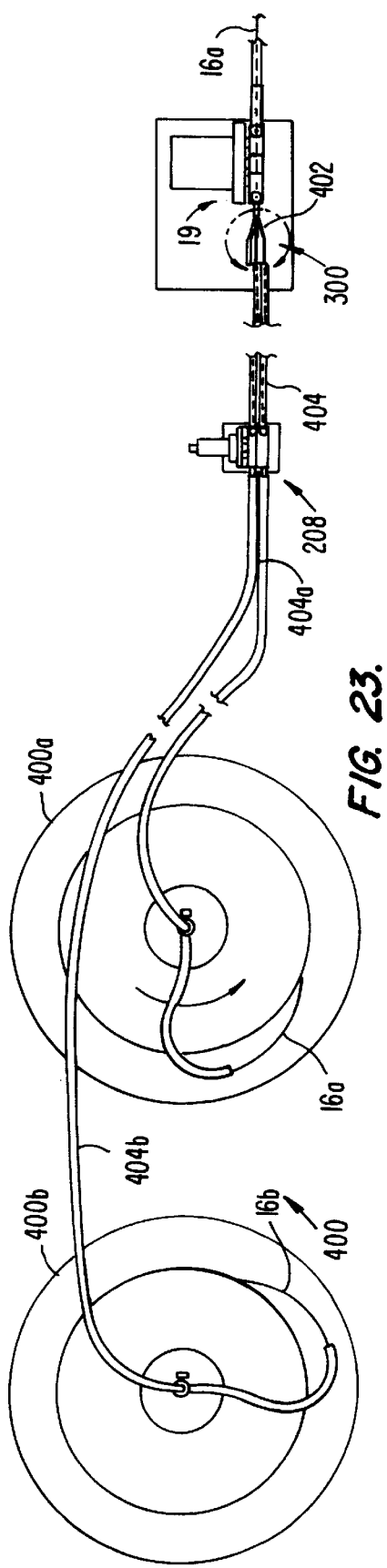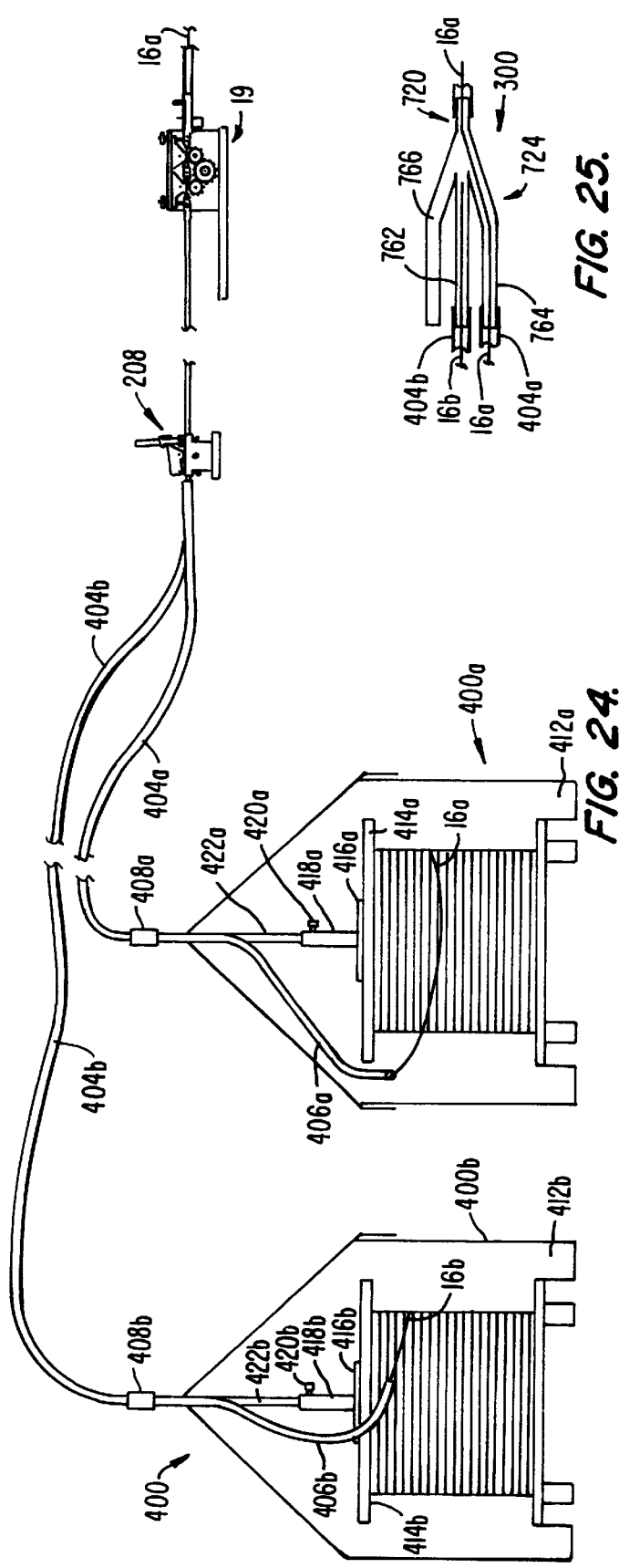
FIG. 23.
FIG. 24.
FIG. 25.

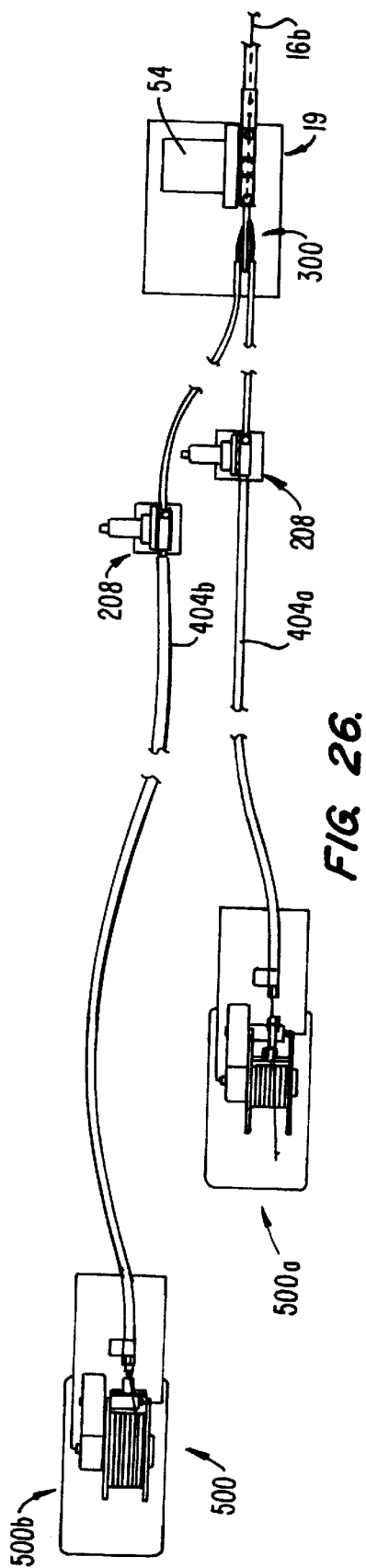
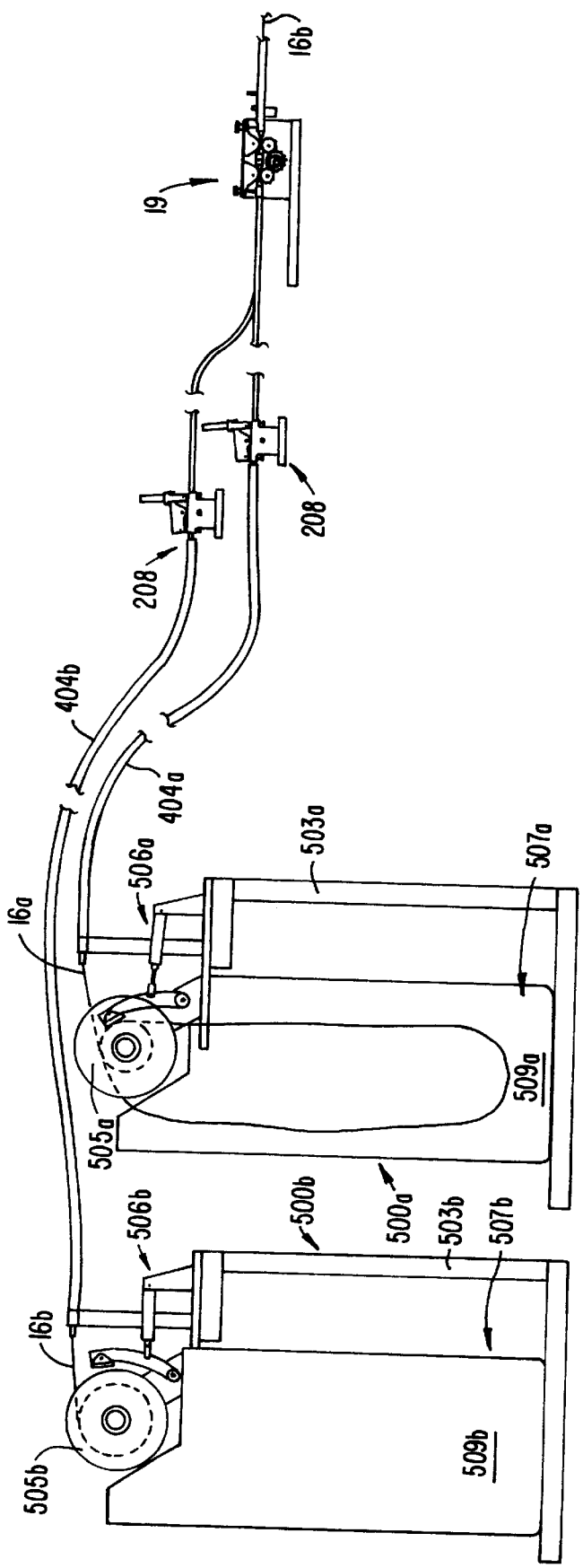
FIG. 26.
FIG. 27.

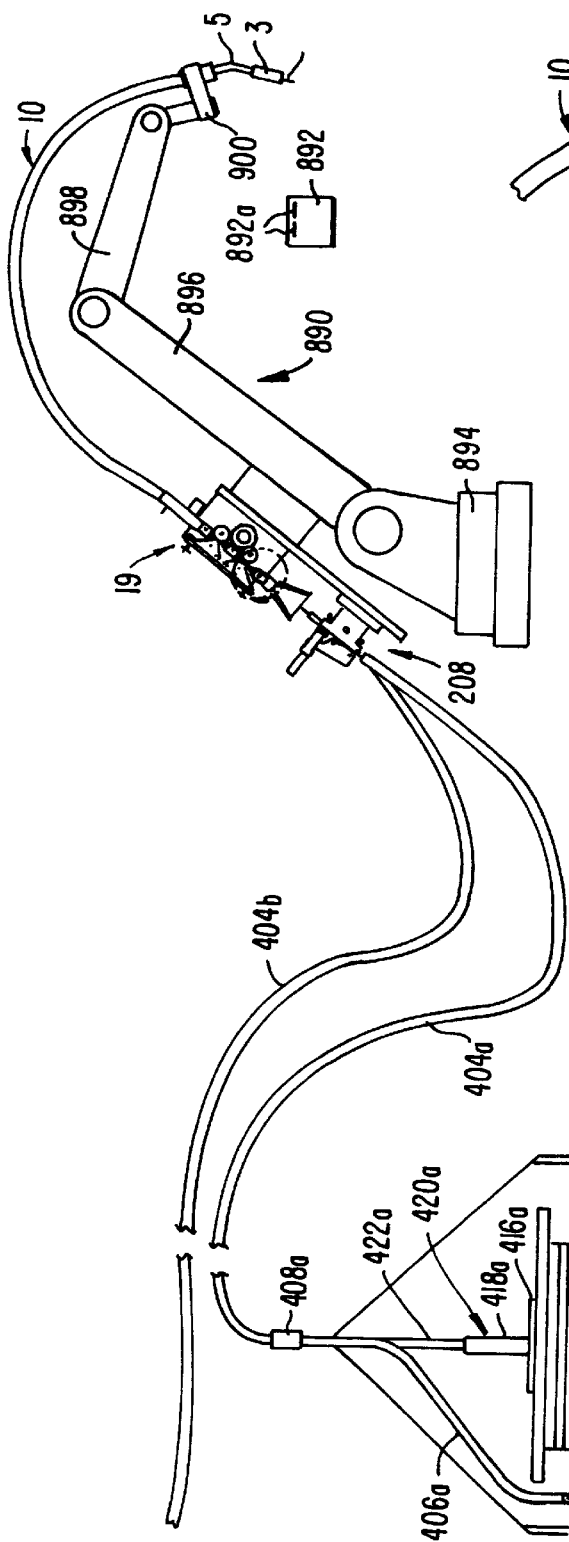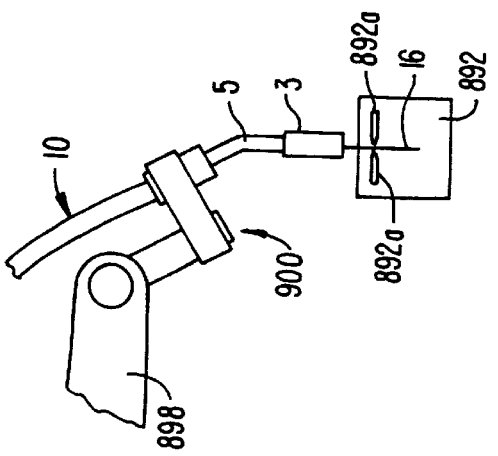
FIG. 30.
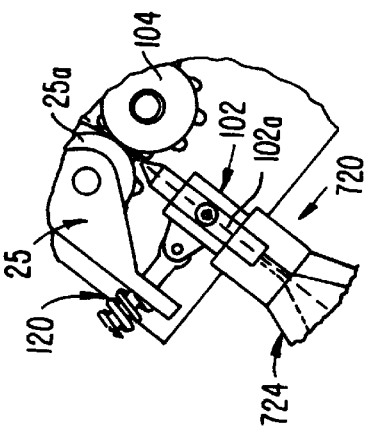
FIG. 29.
FIG. 28.

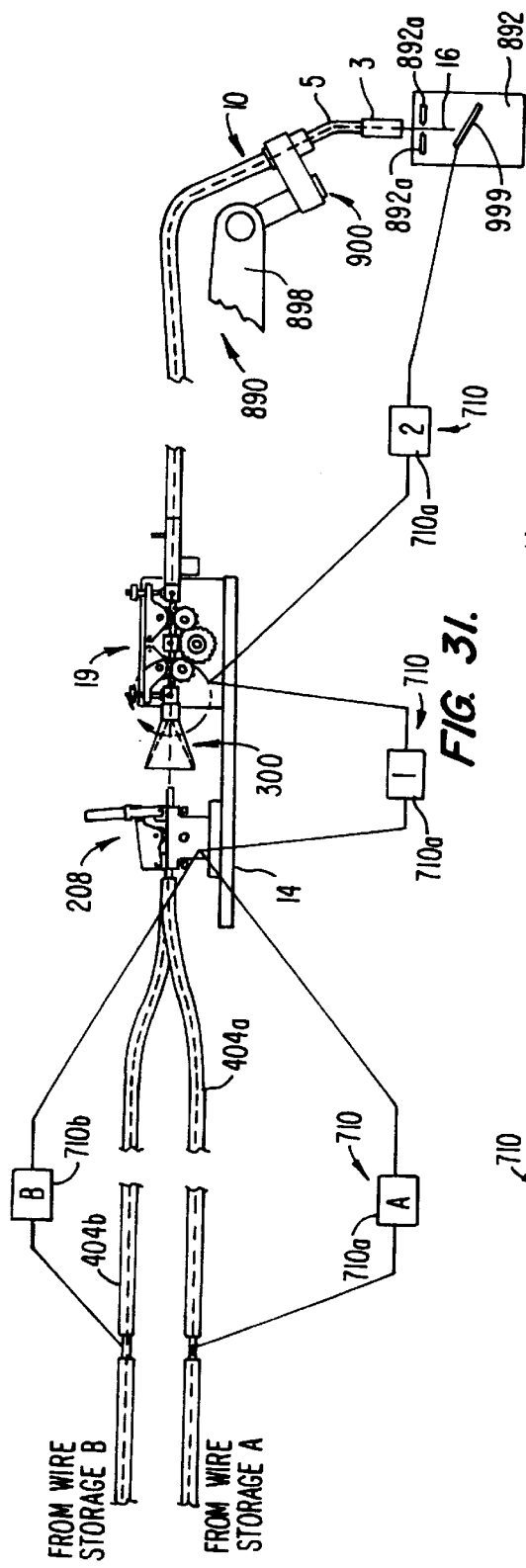
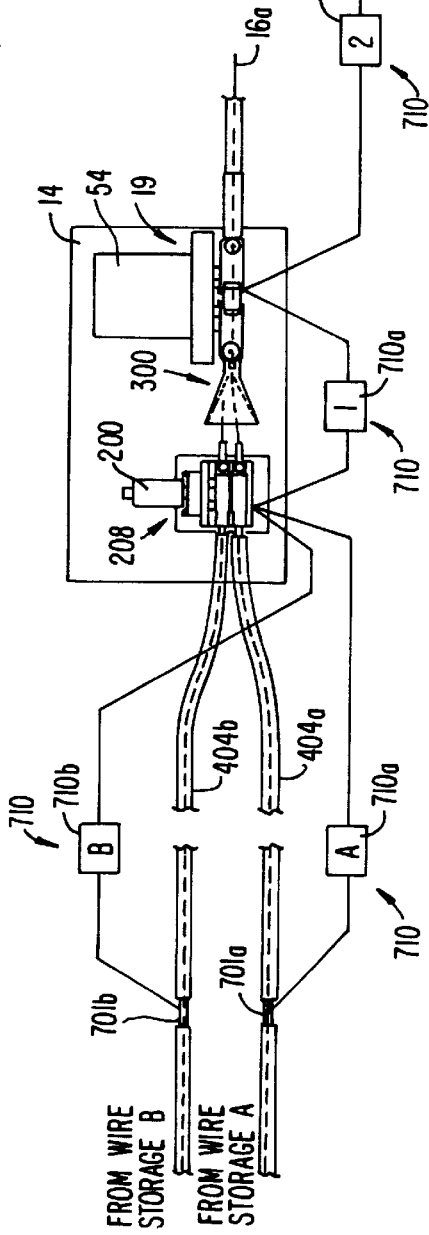
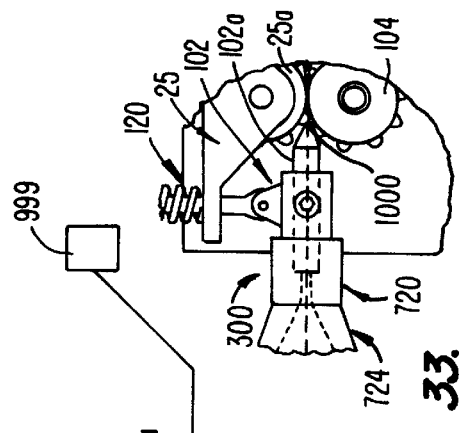

APPARATUS AND METHOD FOR SELECTIVELY CHANGING WELDING WIRE

BACKGROUND OF THE INVENTION

1. Field of the Invention

This invention is generally related to a welding apparatus, especially the type that utilizes a consumable welding wire which is fed from a supply reel, through a wire feeder assembly and subsequently to a welding gun. More particularly, this invention provides an apparatus and method for selectively changing welding wire prior to the welding wire entering a wire feeder assembly for subsequent feeding to a welding gun.

2. Description of the Prior Art

Welding is broadly accomplished by bringing a gun tip of a welding gun into close proximity with a work piece. The power supply and wire feeder assembly are energized by depressing a trigger on the welding gun, which also causes welding wire to move through a flexible conduit leading to the gun tip of the welding gun and be propelled forwardly therefrom. When the welding wire contacts a grounded work piece, electrical current passes through the welding wire to the work piece, causing the welding wire to be heated and melt. An electrical arc is established which continues to melt the welding wire and causes transfer of melted welding wire to the work piece where it fuses and cools. The electrical energy supplied to the welding system is greater than that required to melt the welding wire. Most of the remaining energy in the form of heat is transferred to the surface of the work piece, melting the surface metal on the work piece for improving the bonding of melted welding wire to the work piece. As the welding gun is moved across the work piece, melted welding wire is continuously transferred to the work piece as long as the trigger is depressed and as long as welding wire is available. If the welding operation requires a shielding gas, a gas valve is actuated when the trigger is depressed.

In the course of normal welding, the supply of welding wire will eventually be depleted. When this occurs, the welder or operator will shut down the welding system. In the case of a robot or other automatic welding process, the operator will initiate a safety lockout procedure and enter the welding area. After entering the welding area, the operator will obtain a pair of pliers and grasp the end of the welding wire protruding from the gun tip of the welding gun and pull out any welding wire remaining in the flexible conduit extending to the gun tip. The operator will then remove an empty welding-wire spool from a dereeler and replace it with a new spool of welding wire. The loose end of the welding wire is subsequently threaded through guides and conduits extending to a wire feeder assembly that includes spring loaded pinch rollers which are manually released to allow the welding wire to be threaded through associated feeder guides and into the flexible conduit. The spring loaded pinch rollers are then reapplied. The operator subsequently energizes welding-wire feed by means of a switch (or gun trigger) and the welding wire is propelled through the flexible conduit until it exits the gun tip of the welding gun. Typically, an excess of welding wire comes out of the gun tip. The excess is manually trimmed with side cutter pliers, or in the case of a robot welding process where there is often an automatic stationary cutter available, the robot directs excess welding wire into the automatic stationary cutter where the excess is removed. The welding system is now ready to continue welding.

Many welding operations weld more than one type of metal. Different types of metals require different welding wire compositions. For instance, an operator may be welding mild steel work pieces using a suitable steel wire. If the work pieces change to stainless steel, the operator has to remove the existing spool of steel welding wire and install a spool of suitable stainless steel welding wire. A typical procedure to change welding wire requires a number of steps. Initially, the operator trims the welding wire sticking out of the gun tip. This trimming operation is for removing a ball of metal on the end of the welding wire which is a result of surface tension pulling molten metal up the welding wire when the welding process stops. If a robot system is being employed, the operator directs the robot to use the automatic stationary cutter to remove the ball of metal from the end of the welding wire. The operator then manually releases the spring loaded pinch rollers on the wire feeder. The wire storage spool is subsequently manually rotated in a reverse direction to pull welding wire from the gun tip through the flexible conduit and through the wire feeder. The loose end of the welding wire is then anchored on the spool and the spool is removed. A spool of stainless steel welding wire is subsequently installed. The loose end of the welding wire is then threaded through the wire feeder until it reaches the entrance of the flexible conduit. The spring loaded pinch rollers are reapplied and the wire feeder is energized to feed the welding wire to the gun tip where excess welding wire is trimmed. The operator may now commence welding with stainless steel welding wire.

Therefore, welding wire has to be changed in a wire welding process for two primary reasons. The first primary reason is that the supply of welding wire has been depleted and additional welding wire is required to continue the welding process. The second primary reason for changing welding wire is that the composition of the welding wire has to be changed to accommodate a new welding application. For example, the welding process may be welding mild steel with steel welding wire. If the work pieces change to stainless steel, then an appropriate stainless steel welding wire is required for the new application. Both of the foregoing reasons for changing welding wire produces downtime in the welding operation which should be reduced. The prior art, as evidenced by the following prior art which was discovered in a patentability investigation, does not offer a more optimum solution for reducing downtime in a welding operation when a welding wire has to be changed.

U.S. Pat. No. 3,694,620 to Gleason discloses an electric arc welding system using two welding wires fed through a single torch, with means (e.g. a motor) for driving either welding wire in either direction. U.S. Pat. No. 4,645,894 to Bonga discloses an electrode wire changer and threading mechanism which is capable of handling two or more different types of electrode wires which are for cutting through a work piece.

Japanese Patent No. 36,066 teaches a welding wire supply device. This patent discloses the use of air cylinders as a means for pressing a wire against a drive roller in order that the wire may enter a guide cable for eventual passage through a wire detector. Japanese Patent No. 100,870 discloses a welding device which is similar to what is disclosed in U.S. Pat. No. 3,694,620 to Gleason. Japanese Patent No. 168,967 appears to also teach a system that is comparable not only to U.S. Pat. No. 3,694,620 to Gleason, but also comparable to U.S. Pat. No. 4,645,894 to Bonga. Japanese Patent No. 233,067 teaches that a driving means may be used to move a mechanism to select one of a plurality of feeding wires for feeding to a torch.

The foregoing prior art does not offer a more expedient apparatus and method for changing a welding wire with reduced downtime in a welding process. Therefore, what is needed and what has been invented is an apparatus for selectively changing consumable welding wires such that downtime is reduced in a welding process. What is also needed and what has been invented is a method for selecting any one of a plurality of consumable welding wires without incurring any substantial downtime in a welding operation.

SUMMARY OF THE INVENTION

The present invention accomplishes its desired objects by providing an apparatus for selectively changing consumable welding wires, comprising a base, a drive wheel rotatably secured to the base for engaging a consumable welding wire, and a pinch-roller arm pivotally secured to the base. The apparatus also comprises a pinch roller rotatably secured to the pinch-roller arm for engaging the consumable welding wire, and a cylinder assembly (e.g. a hydraulic cylinder assembly, a pneumatic cylinder assembly, etc.), pivotally secured to the base, for moving the pinch-roller arm towards the base, causing the pinch roller to engage and hold the consumable welding wire in driving engagement with the drive wheel. A motor is coupled to the drive wheel for rotating the drive wheel in a desired direction. A spring member is supported by the base for biasing the pinch-roller arm away from the base. The base preferably comprises a first shoulder pivotally secured to the pinch-roller arm and having a structure defining a base recess wherein the spring member lodges, and a second shoulder pivotally secured to the cylinder assembly. The first shoulder additionally includes a first bore and a first screw opening communicating with the first bore, and the second shoulder additionally includes a second bore and a second screw opening communicating with the second bore.

The cylinder assembly preferably comprises a clevis including a clevis base having a clevis opening, a pair of clevis arms bound to the clevis base and pivotally secured to the second shoulder of the base, and a cylinder supported by the clevis base and having a cylinder rod slidably passing through the clevis opening for removably engaging the pinch-roller arm. In a preferred embodiment of the invention, the apparatus for selectively changing consumable welding wire additionally preferably includes a first wire-guide conduit generally concentrically disposed in the first bore and a first set screw rotatably lodged in the first screw opening. Similarly, a second wire-guide conduit is generally concentrically disposed in the second bore and a second set screw is rotatably lodged in the second screw opening. The pinch-roller arm has an arm lip, and the clevis arms of the cylinder assembly are generally parallelly disposed with respect to each other such as to form a clevis slot therebetween. The arm lip of the pinch-roller arm removably lodges in the clevis slot.

Another embodiment of the present invention accomplishes its desired objects by broadly providing another embodiment of the apparatus for selectively changing consumable welding wires. The apparatus comprises a base having a base cavity, a drive wheel disposed in the base cavity and rotatably supported by the base for engaging a consumable welding wire, and a pinch-roller arm pivotally secured to the base. A motor is coupled to a drive wheel for rotating the drive wheel in a desired location. A pinch roller is rotatably secured to the pinch-roller arm for engaging the consumable welding wire. The apparatus also has a spring assembly supported by the base for biasing the pinch-roller arm towards the base, causing the pinch roller to engage and hold the consumable welding wire in driving engagement with the drive wheel. A cylinder assembly, such as a hydraulic or a pneumatic cylinder assembly, is supported by the pinch-roller arm for moving the pinch-roller arm away from the base to cause the pinch roller to disengage and release the consumable welding wire from driving engagement with the drive wheel.

The spring assembly comprises a shaft pivotally connected to the base, a spring cup slidably disposed on the shaft, an adjusting nut threadably engaged to the shaft, and a spring member helically surrounding the shaft between the adjusting nut and the spring cup. The pinch-roller arm terminates in a bifurcated structure having a pair of arm forks wherebetween an arm slot is defined, and the shaft of the spring assembly is removably disposed within the arm slot. Each of the arm forks has a generally arcuate surface for engaging the spring cup to facilitate the sliding of the spring cup along the shaft and towards the adjusting nut for compressing the spring member between the spring cup and the adjusting nut. The base includes a first shoulder pivotally secured to the pinch-roller arm, and a second shoulder pivotally secured to the spring assembly. Each of the shoulders has a bore for receiving a wire-guide conduit, and a screw opening communicating with the bore for receiving a set screw.

The present invention also provides a further embodiment of the apparatus for selecting a consumable welding wire from a plurality of consumable welding wires. The apparatus includes a base, and a drive wheel coupled to a drive motor and rotatably supported by the base for engaging a consumable welding wire. A plurality of pinch-rollers is rotatably secured to the pinch-roller arms. Spring assemblies are supported by the base for biasing the pinch-roller arms, and pneumatic cylinder assemblies engage the base and the pinch-roller arms for moving the pinch-roller arms relative to the base. In one embodiment, the spring assemblies include spring members which lodge or seat in base recesses contained in the base. In another embodiment, each of the spring assemblies comprises a shaft pivotally secured to the base, a spring cup slidably disposed on the shaft, an adjusting nut threadably engaged to the shaft, and a spring member helically surrounding the shaft between the adjusting nut and the spring cup.

The present invention also accomplishes its desired objects by providing an apparatus for selecting and guiding any one of a plurality of consumable welding wires to a welding wire feeder assembly. The apparatus includes a first welding-wire source of supply having a first consumable welding wire, a second welding-wire source of supply having a second consumable welding wire, and a wire changer assembly including a base and a drive wheel rotatably supported by the base for engaging the first consumable welding wire and the second consumable welding wire. A first pinch-roller arm is pivotally secured to the base and has a first pinch roller rotatably secured thereto for engaging the first consumable welding wire. A second pinch-roller arm is similarly pivotally secured to the base and has a second pinch roller rotatably secured thereto for engaging the second consumable welding wire. The wire changer assembly additionally includes a first spring assembly supported by the base for biasing the first pinch-roller arm and a second spring assembly supported by the base for biasing the second pinch-roller arm. A first cylinder (e.g. a first hydraulic cylinder or a first pneumatic cylinder, or etc.) releasably engages the first pinch-roller arm for moving the first pinch-roller arm relative to the base to cause the first pinch roller to releasably engage the first consumable welding wire. Similarly, a second cylinder (e.g. a second hydraulic cylinder or a second pneumatic cylinder, or etc.) releasably engages the second pinch-roller arm for moving the second pinch-roller arm relative to the base to cause the second pinch roller to releasably engage the second consumable welding wire. An aligning assembly is provided to slidably contact the first consumable welding wire and the second consumable welding wire and to allow passage of only the first consumable welding wire or the second consumable wire. A welding wire feeder assembly supports the aligning assembly for receiving only the first consumable welding wire or the second consumable welding wire.

The apparatus for selecting and guiding any one of a plurality of consumable welding wires to a welding wire feeder assembly additionally comprises a welding gun assembly coupled to the welding wire feeder assembly which feeds the first consumable welding wire or the second consumable welding wire to the welding gun assembly. In one embodiment of the invention, the aligning assembly comprises a funnel-shaped cone member having a cone opening for allowing passage of only one of the consumable welding wires at a time. In another embodiment of the invention, the aligning assembly additionally comprises a first conduit member and a second conduit coupled to the funnel-shaped cone member. The first consumable welding wire slidably passes through the first conduit for entering the funnel-shaped cone member and subsequent passage through the cone opening. Similarly, the second consumable welding wire slidably passes through the second conduit for entering the funnel-shaped cone member and subsequent passage through the cone opening.

Each of the welding-wire sources of supply comprises a reel stand, and a reel wound with associated consumable welding wire and rotatably supported by the reel stand. A brake assembly is supported by the reel stand for releasably engaging any associated consumable welding wire wound on the reel. Each of the welding-wire sources also comprises a container coupled to the reel stand. The container has a container recess disposed under the reel for providing a zone for accumulating the associated consumable welding wire when a direction of movement of the consumable welding wire is reversed such that welding-wire movement is towards the reel and away from the welding wire feeder assembly.

The apparatus of the present invention are intended to reduce down time associated with changing welding wire in a welding process which uses wire as a filler metal. Among the welding processes and systems which could use the apparatus are gas metal-arc welding (MIG), flux-cored arc welding, submerged-arc welding and some configurations of gas tungsten-arc welding (TIG). The apparatuses are applicable for semi-automatic wire welding and may be utilized with machine, automatic, and robotic wire welding processes. The apparatuses of the present invention are also intended to increase operator safety, because in many conventional welding processes and systems, the locations of the various welding components are often difficult or unsafe to access for the purpose of changing wire.

The present invention also broadly provides a method for selecting and guiding any one of a plurality of consumable welding wires to a welding wire feeder assembly. The method broadly comprises selecting a consumable welding wire from a plurality of consumable welding wires by pivoting a pinch-roller arm. After a consumable welding wire has been selected, it is subsequently passed through an aligning assembly (e.g., a funnel-shaped cone member, etc.), and then through a welding wire feeder assembly which feeds the selected consumable welding wire to a welding gun assembly that has a welding gun for welding a work piece with the consumable welding wire.

In one embodiment of the present invention, a method for selecting any one of a plurality of consumable welding wires more specifically comprises the steps of:

(a) providing a wire changer assembly having a rotatable drive wheel, a first pinch-roller assembly having a first rotatable pinch roller spaced from the rotatable drive wheel, and a second pinch-roller assembly having a second rotatable pinch roller spaced from the rotatable drive wheel;

(b) passing a first consumable welding wire between the rotatable drive wheel and the first rotatable pinch roller of the first pinch-roller assembly;

(c) passing a second consumable welding wire between the rotatable drive wheel and the second rotatable pinch roller of the second pinch-roller assembly; and (d) pivoting the first pinch-roller assembly, causing the first rotatably pinch roller to engage and hold the first consumable welding wire in driving engagement with the rotatable drive wheel.

In another embodiment of the present invention, a method for selecting any one of a plurality of consumable welding wires more specifically comprises the steps of:

(a) providing a wire changer assembly having a rotatable drive wheel, a first pinch-roller assembly having a first pinch roller and being biased such that the first pinch roller engages and holds a first consumable welding wire in driving engagement with the drive wheel, and a second pinch-roller assembly having a second pinch roller and being biased such that the second pinch roller engages and holds a second consumable welding wire in driving engagement with the drive wheel; and (b) pivoting the second pinch-roller assembly, causing the second pinch roller to disengage and release the second consumable welding wire from driving engagement with the drive wheel and allowing the first consumable welding wire to be moved when the drive wheel is rotated.

It is therefore an object of the present invention to provide an apparatus for selectively changing consumable welding wires.

It is another object of the present invention to provide a method for selecting any one of a plurality of consumable welding wires.

These, together with the various ancillary objects and features which will become apparent to those skilled in the art as the following description proceeds, are attained by these novel apparatuses and methods, a preferred embodiment thereof shown with reference to the accompanying drawings, by way of example only, wherein:

BRIEF DESCRIPTION OF THE DRAWINGS

FIG. 3A is a top plan view of one embodiment of the wire changer assembly of the present invention having four spring-biased pinch-roll assemblies pivotally connected to a base with each pinch-roll assembly being capable of being driven downwardly by a pneumatic cylinder assembly in order to cause a pinch-roller to place a welding wire in driving engagement with a drive wheel;

FIG. 3B is a side elevational view of the wire changer assembly of FIG. 3A;

FIG. 3C is an end elevational view of the wire changer assembly of FIG. 3A with one of the spring-biased pinch-roll assemblies having been pivoted or driven downwardly by an associated pneumatic cylinder to cause a welding wire to be selected and to be moved through the wire changer assembly;

FIG. 3D is an end elevational view of the wire changer assembly of FIG. 3A with one of the spring-biased pinch-roller assemblies being biased upwardly and not being driven or pivoted downwardly by the pneumatic cylinder assembly associated with the spring-biased pinch-roller assembly such that the welding wire aligned with the spring-biased pinch-roll assembly not in driving engagement with the drive wheel;

FIG. 3E is a vertical sectional view of the wire changer assembly including the spring-biased pinch-roll assembly of FIG. 3C illustrating the pinch-roller having placed a consumable welding wire in driving engagement with a drive wheel;

FIG. 3F is a partial vertical sectional view of the wire changer assembly including the spring-biased pinch-roll assembly of FIG. 3D showing the spring-biased pinch-roll assembly elevated or pivoted away from the base such that its associated pinch-roller is not placing the welding in a driving engagement with the driver roll;

FIG. 3G is a partial vertical sectional view of the wire changer assembly of FIG. 3A having one of the pinch roll assemblies pivoted into a oblique position to expose the drive wheel and the welding wire passing through the wire changer assembly;

FIG. 5 is a side elevational view of a motor coupled to the drive shaft through a gear assembly contained in the illustrated gear box;

FIG. 6 is a side elevational view of a single drive wheel having the drive shaft of FIG. 5 coupled thereto and including a plurality of multiple wire grooves where welding wire may lodge for frictional engagement with the single drive wheel when driven against the drive wheel by a pinch-roller member;

FIG. 7 is a side elevational view of multiple drive wheels coupled to the drive shaft of FIG. 5 with each drive wheel having wire grooves where a welding wire frictionally lodges when driven therein by a pinch-roller of a pinch-roller assembly;

FIG. 8 is an end elevational view of the multiple drive wheel assembly of FIG. 7;

FIG. 16 is a side elevational view of another embodiment of the aligning assembly having a plurality of conduits connected to and communicating with a central conduit which has a wire feeder adaptor slidably mounted thereon and releasably secured to a wire guide having a welding wire passing therethrough;

FIG. 17 is an end elevational view of the aligning assembly of FIG. 16;

FIG. 18 is a partial vertical sectional view of the aligning assembly of FIG. 16;

FIG. 19 is a side elevational view of another embodiment of the aligning assembly having a plurality of conduits communicating with a wire feeder adaptor for directing a particular welding wire into a wire guide member which is capable of only passing a single welding wire therethrough;

FIG. 20 is an end elevational view of the aligning assembly of FIG. 19;

FIG. 21 is a partial vertical sectional view of the aligning assembly of FIG. 19 disclosing such grooves for engaging a particular conduit for reducing a converging angle to reduce welding wire wear and buckling;

FIG. 22A is a top plan view of one embodiment of the apparatus of the present invention for selecting and guiding anyone of a plurality of consumable welding wires to a welding wire feeder assembly which subsequently moves a selected consumable welding wire to a welding gun assembly for welding purposes;

FIG. 22B is a side elevational view of the apparatus of FIG. 22A;

FIG. 23 is a plan view of another embodiment of an apparatus of the present invention for selecting and guiding any one of a plurality of consumable welding wires to a welding wire feeder assembly for subsequently feeding to a welding gun assembly to conduct a welding operation;

FIG. 24 is a side elevational view of the apparatus of FIG. 23;

FIG. 25 is a partial enlarged sectional view of the aligning assembly employed in the apparatus of FIG. 23;

FIG. 26 is a top plan view of another embodiment of the apparatus of the present invention for selecting and guiding anyone of a plurality of consumable welding wires to a welding wire feeder assembly which subsequently moves a selected welding wire to a welding gun assembly such that a welding operation may be conducted on a work piece;

FIG. 27 is a side elevational view of the apparatus of FIG. 26 disclosing of a pair of welding-wire reel assemblies with each welding wire reel assembly being supported by a stand and including a container disposed generally immediately thereunder such that the container forms an accumulation zone for welding wire when welding wire is moved by the wire feeder assembly in a direction towards the welding-wire reel and away from the welding gun assembly;

FIG. 28 is a side elevational view of a robot-type apparatus of the present invention for selecting and guiding any one of a plurality of consumable welding wires to a welding wire feeder assembly;

FIG. 29 is an enlarged partial side elevational view of a section of the aligning assembly being supported by the wire feeder assembly disclosed in FIG. 28;

FIG. 30 is an enlarged partial side elevational view of the welding gun assembly having excessive welding wire extending therefrom and disposed in a generally associated wire trimmer;

FIG. 31 is a side elevational view of another embodiment of a robot-type welding apparatus for selecting and guiding any one of a plurality of consumable welding wires to a welding wire feeder assembly for subsequent feeding to a robot-type welding gun assembly including a welding gun for conducting a welding process on a workpiece;

FIG. 32 is a top plan view of the robot-type welding of FIG. 31;

FIG. 33 is an enlarged partial side elevational view of the aligning assembly (i.e., a converging cone) and the wire feeder assembly for the robot-type welding apparatus of FIGS. 31 and 32.

DESCRIPTION OF THE PREFERRED EMBODIMENT

Figure 1:
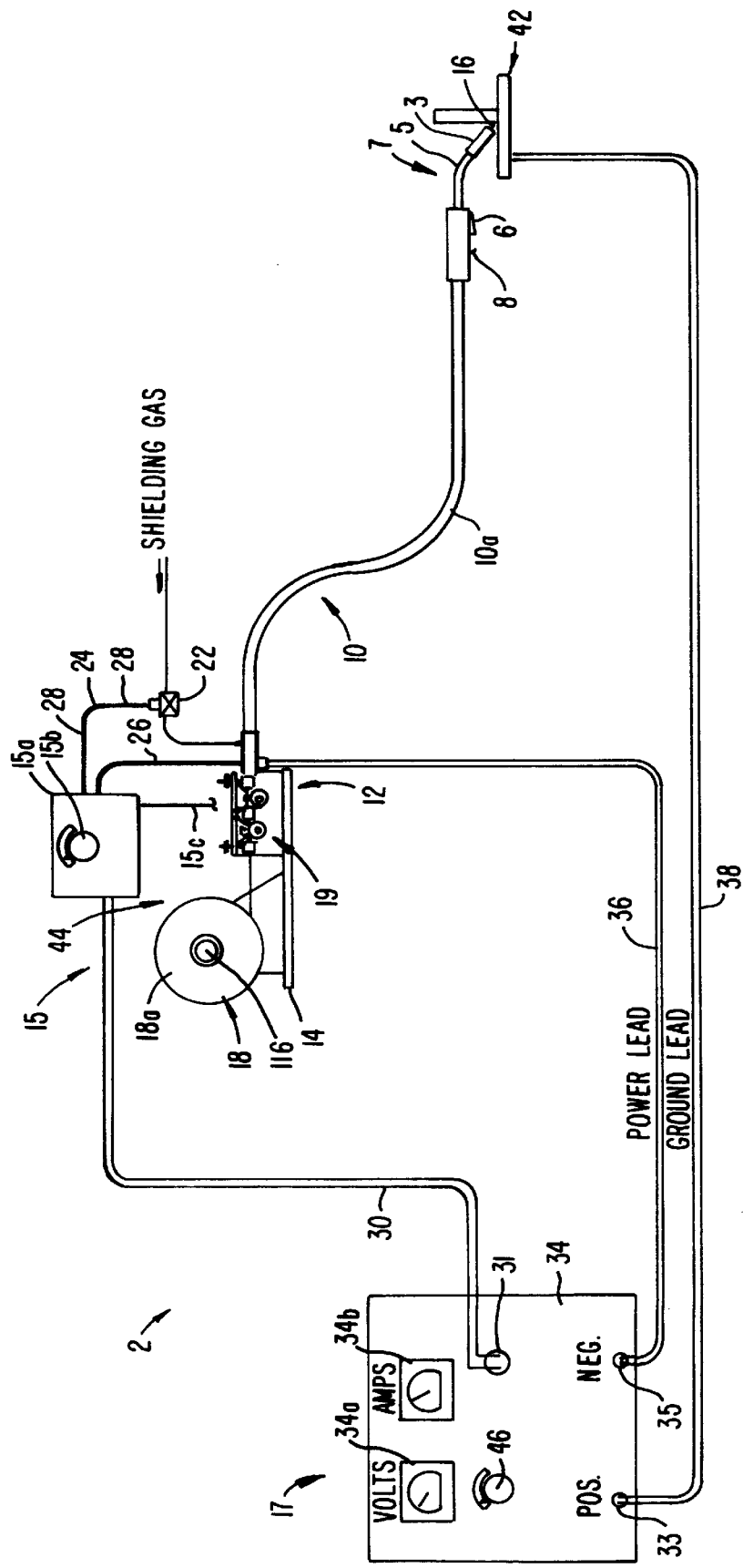
FIG. 1 is a side elevational view of a prior art MIG welding system.
Figure 2A:
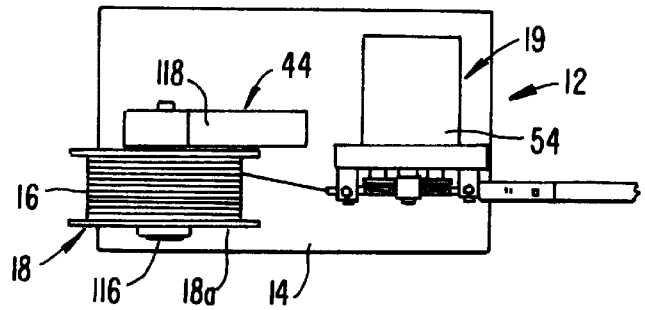
FIG. 2A is a top plan view of a prior art wire feeder assembly and a wire spool wound with welding wire and illustrating a portion of the welding wire extending through the wire feeder assembly.
Figure 2B:
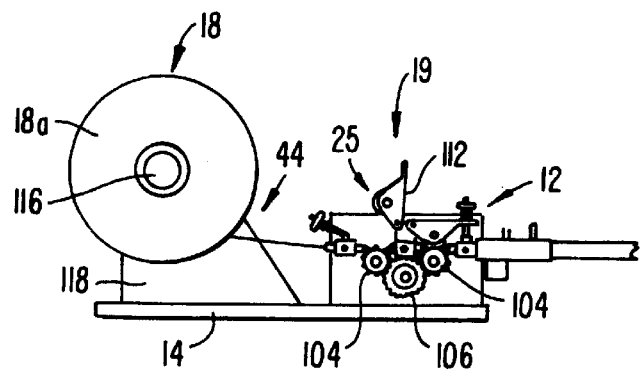
FIG. 2B is side elevational view of the wire feeder assembly and the wire spool of FIG. 2A.
Figure 2C:
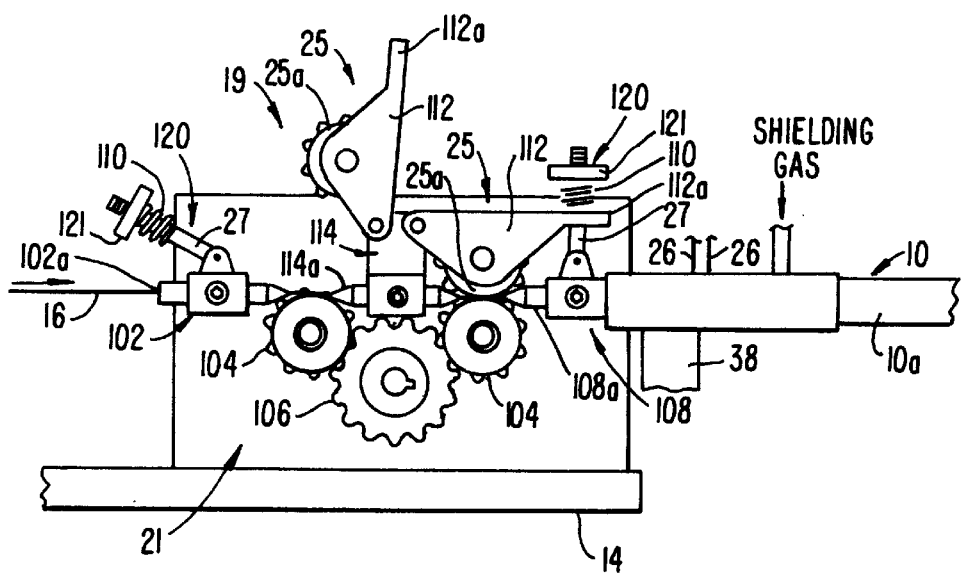
FIG. 2C is an enlarged side elevational view of the prior art wire feeder assembly of FIG. 2A and illustrating a main drive gear rotatably engaged to a pair of drive rollers and having a welding wire passing through an inlet guide, and intermittent guide, and an exit guide, with a pair of pinch-roll assemblies wherein one of the pinch-roll assemblies is pivoted into an open and released position and with the other pinch-roll assembly blocked into an operating position with a tension spring assembly biasing the locked pinch-roll assembly.

Referring in detail now to the drawings wherein similar parts of the invention are identical like reference numerals, there is seen in FIGS. 1–2C components of a prior art MIG welding-wire system, generally illustrated as 2. The prior art MIG welding-wire system 2 in FIGS. 1–2C comprises a welding gun assembly 7 coupled to a whip assembly 10. The whip assembly 10 is connected to a wire feeder assembly 12, and a control assembly, generally illustrated as 15, connects to the wire feeder assembly 12 and to the whip assembly 10. A power supply assembly, generally illustrated as 17, is connected to the control assembly 15 and to the whip assembly 10.

The welding gun assembly 7 includes a handle 8, a trigger 6 operatively disposed on the handle 8, and a neck 5 attached to the handle 8 and to a tip (contact tube) 3. As best shown in FIG. 1, the tip 3 is mounted at the end of the neck 5 such as to be in a position to transfer electrical power to a welding wire 16. Disposed in proximity to the tip 3 is a work-piece assembly 42 which is to be welded.

The whip assembly 10 in FIG. 1 guides welding wire 16 to the welding gun assembly 7 and has a protective rubber casing 10a. Enclosed within the protective rubber casing 10a are the following components: trigger wires 26, a gas tube or duct (not shown), a power lead 36, a wire-feed conduit (not shown), and the welding wire 16. The wire-feed conduit (not shown) would have an inside diameter slightly larger than the welding wire 16 to prevent the welding wire 16 from buckling. Running parallel to the wire-feed conduit would be the power lead 36 which furnishes electrical energy to the welding gun assembly 7 for the welding operation. In the prior art MIG welding-wire system 2 of FIG. 1, special shielding gases are required to shield and enhance the welding process. Therefore, the whip assembly 10 would include a gas tube or duct (not shown) for transporting shielding gases to the welding gun assembly 7.

The wire feeder assembly 12 in FIG. 1 has an insulated base 14 and a spool assembly 18 supported by the insulated base 14. The wire feeder assembly 12 also has a wire feeder, generally illustrated as 19 and supported by the insulated base 14. The spool assembly 18 functions as a wire storage device and includes a dereeler, generally illustrated as 44 (see FIGS. 2A and 2B). The dereeler 44 has a spool axle 116 for supporting a spool 18a which holds welding wire 16 in a position to be removed by the wire feeder 19. The spool axle 116 is rotatably supported by a spool support 118 that is connected to and supported by the insulated base 14. The spool axle 116 also electrically isolates the welding wire 16 from ground and provides a point of rotation so that the welding wire 16 may be pulled off the spool 18a. The spool assembly 18 is normally limited to a weight of about 60 pounds for ease of handling by a welder or operator.

A friction brake (not shown) is usually associated with the dereeler 44 to prevent the spool 18a from over running when the welding wire 16 stops moving. The friction brake is also for maintaining tension on the welding wire 16 during the welding process. Some types of welding wire 16 are naturally "springy" and tend to uncoil if the welding wire 16 is released or has lost tension. If the uncoiling is excessive such that welding-wire coils are produced, the welding-wire coils can become intertwined and tangled, a preventing the wire feeder 19 from pulling additional welding wire 16 off of spool 18a. In such a situation, the operator will have to manually untangle the welding-wire coils.

The wire feeder 19 of the spool assembly 18 in the welding-wire system 2 of FIG. 1, is used to propel welding wire 16 from or off of the spool 18a and through the whip assembly 10 to the work-piece assembly 42 which is disposed in proximity to the tip 3 of the gun assembly 7 (see FIG. 1). The wire feeder 19 has a bracket 21 and a variable speed reversible electric motor 54 (see FIGS. 2A–2C), both supported by the insulated base 14. A pair of drive rolls 104—104 and a drive gear 106 are rotatably supported by the bracket 21. As best shown in FIG. 2C, drive gear 106 is coupled to the reversible electric motor 54 and meshes and/or gears with the drive rolls 104—104 such that when electric motor 54 rotates drive gear 106, drive rolls 104—104 simultaneously rotate therewith. Electric motor 54 is a reversible drive which is capable of rotating drive gear 106 (and drive rolls 104—104) either clockwise or counterclockwise.

The wire feeder 19 includes an inlet guide assembly 102 with an inlet guide 102a, an intermittent guide assembly 114 with an intermittent guide 114a, and an exit guide assembly 108 with an exit guide 108a, all connected to the bracket 21 as shown in FIG. 2A. The exit guide assembly 108 connects to and communicates with the whip assembly 10. A pair of pinch roll assemblies 25—25 pivotally attaches to the intermittent guide assembly 114 (see FIG. 2C). Each pinch roll assembly 25 has a pinch-roll frame 112 which is pivotally secured to the intermittent guide assembly 114 and includes a bifurcated end 112a with an end slot (not shown). Each pinch roll assembly 25 has a pinch roll 25a rotatably connected thereto.

A pair of tension assemblies 120—120 is provided. One tension assembly 120 pivotally connects to the inlet guide assembly 102 and the other tension assembly 120 pivotally connects to the exit guide assembly 108. Each of the tension assemblies 120 includes a shaft 27 pivotally secured to its associated guide assembly (i.e., either inlet guide assembly 102 or exit guide assembly 108) and has a compression spring member 110 helically surrounding the shaft 27. An adjustable tension nut 121 threadably engages an end of the shaft 27 and is employed to set the spring force of compression spring member 110. When the shaft 27 is pivoted into the end slot (not shown) of the bifurcated end 112a of the pinch-roll frame 112, rotation of the tension nut 121 adjusts the compression force of the compression spring member 110 upon the bifurcated end 112a of the pinch-roll frame 112. This, in turn, adjusts the amount of compression force that the pinch roll 25a is placing upon the drive roll 104 and any welding wire 16 sandwiched between the pinch roll 25a and the drive roll 104. Desirably, the spring force of the compression spring member 110 is of such a magnitude that the pinch roll 25a can hold the welding wire in driving engagement with the drive roll 104.

The surface of the pinch rolls 25a—25a may be of any suitable geometric shape, such as flat, concave, knurled or have circumferential V-shaped grooves. The type and gage of welding wire 16 and the welding process determines the type of geometric surface for the pinch rolls 25a—25a. When the welding process employs a hard welding wire, such as steel for steel welding purposes, the pinch rolls 25a—25a would each have circumferential V-shaped grooves with the depth of each groove being a function of the wire gage friction. The compression spring members 110—110 may be manually tensioned to create the desired range of friction by merely rotating the tension adjusting nuts 121—121. With a soft welding wire 16 where a high spring force by spring members 110—110 would distort the soft welding wire 16, knurled wheels (not shown) are used for pinch rolls 25a—25a to ensure adequate propelling force with reduced spring loading.

The wire feeder 19 uses the respective guide assemblies (i.e., inlet guide assembly 102, intermittent guide assembly 114 and exit guide assembly 108) to support and direct the welding wire 16 to and from the rolls (i.e., drive rolls 104—104 and pinch rolls 25a—25a). With soft or small diameter welding wire 16 which is susceptible to buckling, the respective guides (i.e., inlet guide 102a, intermittent guide 114a, and exit guide 108a) of the guide assemblies (i.e., inlet guide assembly 102, intermittent guide assembly 114, and exit guide assembly 108) are tapered as best shown in FIG. 2C so that they may be disposed as close as possibly to the drive rolls 104—104.

The variable speed motor 54 can be set manually by the welder or operator to feed welding wire 16 to the whip assembly 10 at the correct speed. In automatic and robotic welding systems, the wire feeder speed of the wire feeder 19 may be set without any intervention by the welder or operator. In other types of welding systems, the wire feeder speed may be set by the control assembly 15.

The control assembly 15 for the prior art MIG welding-wire system 2 of FIG. 1 includes a wire feeder control box 15a having a speed control knob 15b for controlling the amount of current flowing through electrical wires 15c that extend from the wire feeder control box 15a to the electric motor 54 of the wire feeder 19. The trigger wires 26 extend from the wire feeder control box 15a through the whip assembly 10 to the trigger 6 of the welding gun assembly 7. Conductors 28 extend from the wire feeder control by 15a to a gas valve 22 which is in communication with a shielding gas source (not shown). The control box 15a, upon receiving a signal when trigger 6 is depressed, turns on power supply assembly 17, activates and starts electric motor 54 whose motor speed is preset with control knob 15b of the control box 15a, and turns on or opens gas valve 22.

The power supply assembly 17 in the prior art MIG welding-wire system 2 of FIG. 1 includes a power source (not shown) in communication with a power control panel 34 having a contactor outlet 31, a positive terminal outlet 33 and a negative terminal outlet 35. The power control panel 34 also has a voltage control member 46, a volt meter 34a, and an amp meter 34b. A ground lead 38 extends from the positive terminal outlet 33 to the work-piece assembly 42. A power lead 36 extends from the negative terminal outlet 35 to the whip assembly 10. It is understood and well known that some welding procedures would interchange the power lead 36 and the ground lead 38 (i.e., interchange the positive and negative terminals). Contactor conductors 34 extend from the contactor outlet 31 to the wire feeder control box 15a. The power supply assembly 17 furnishes the required electrical energy for the prior art MIG welding-wire system 2 to perform a welding task.

Figure 3H:
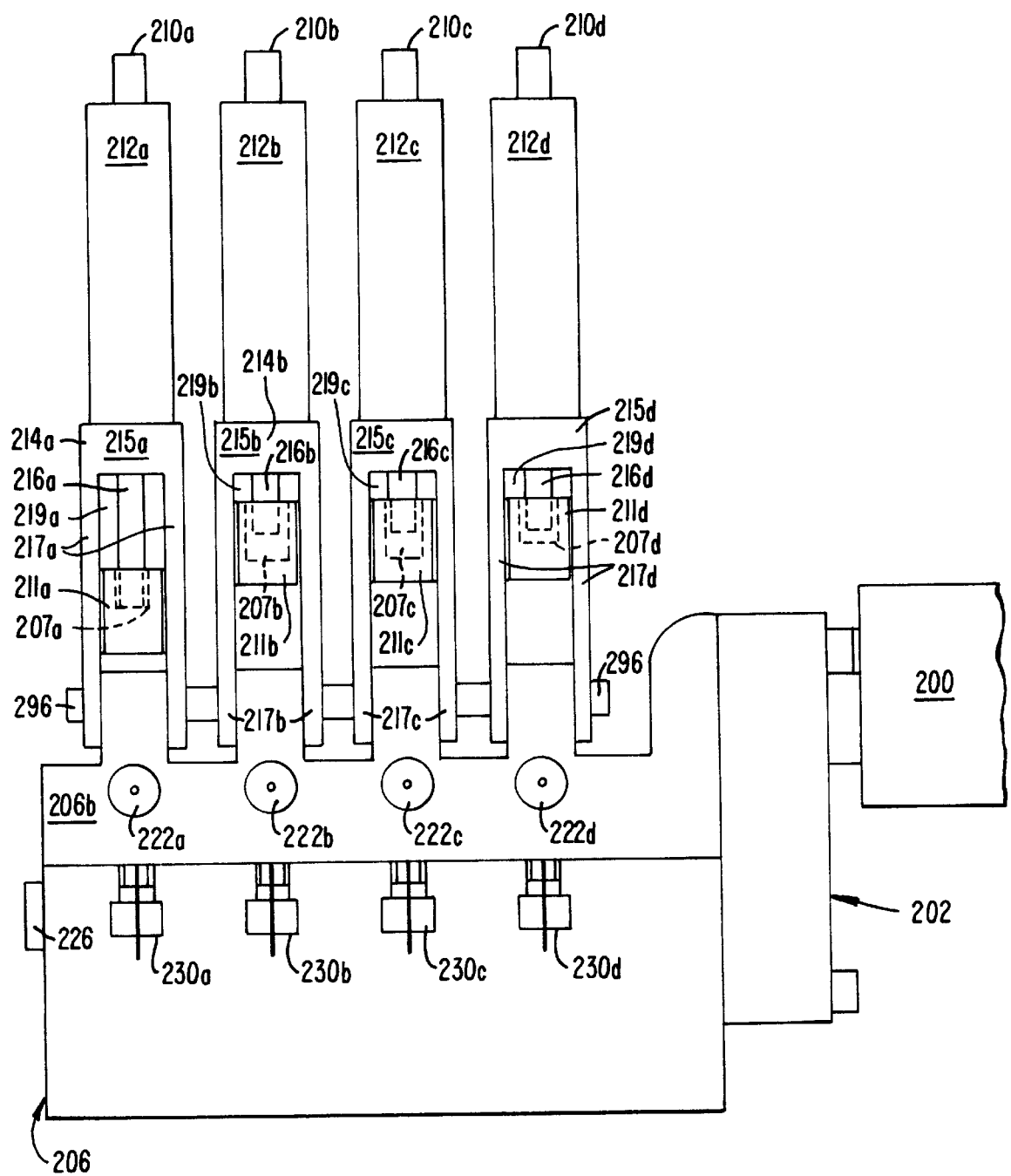
FIG. 3H is a partial exploded view of the side elevational view of FIG. 3B.

Referring now to FIGS. 3A–3H there is seen one preferred embodiment of a wire changer, generally illustrated as 208, for selectively changing welding wires 16 for any suitable welding system. The wire changer 208 in FIG. 3A is a multi-section wire changer which will handle a plurality of consumable welding wires 16. More specifically, the wire changer 208 in FIG. 3A is a four section wire changer shown to handle welding wires 16a, 16b, 16c and 16d. The wire changer 208 includes a base 206, a drive-wheel axle 226 rotatably supported by the base 206, and at least one drive wheel 224 circumscribingly mounted on the driver wheel axle 226 such as to rotate therewith. A reversible motor 200 is coupled to the drive-wheel axle 226 through a gear box assembly, generally illustrated 202. The base 206 is formed with base shoulders 206a and 206b.

A plurality of pinch-roller assemblies, generally illustrated as 204, is pivotally secured to the base 206, more specifically to base shoulder 206a. For the wire changer 208 in FIG. 3A, four pinch-roller assemblies are shown respectively designated as 204a, 204b, 204c and 204d, all of which pivotally connect to base shoulder 206a. The pinch-roller assemblies 204a, 204b, 204c and 204d respectively include pinch-roller arms 218a, 218b, 218c and 218d pivotally connected to the base shoulder 206a via an arm pin 276. Pinch-rollers 220a, 220b, 220c and 220d are respectively rotatably secured to pinch-roller arms 218a, 218b, 218c and 218d via respective roller pins 292a, 292b, 292c and 292d for contacting and holding the respective associated welding wires 16a, 16b, 16c, and 16d in driving engagement with at least one drive wheel 224. Pinch-roller arms 218a, 218b, 218c and 218d respectively have pinch-roller lips 211a, 211b, 211c and 211d (see FIG. 3H) which respectively have rod-receiving recesses 207a, 207b, 207c and 207d.

The base shoulder 206a supports a plurality of spring members, generally illustrated as 232 (see FIG. 3E), for biasing the plurality of pinch-roller assemblies 204. More specifically, base shoulder 206a supports spring members 232a, 232b, 232c and 232d for respectively biasing pinch-roller arms 218a, 218b, 218c and 218d away from the base 206. Base shoulder 206a has a base recess 231a wherein spring member 232a lodges. Base shoulder 206a also has additional similar base recesses 231b, 231c, and 231d wherein spring members 232b, 232c and 232d lodge respectively (see FIG. 9).

The wire changer 208 of FIGS. 3A–3H also has a plurality of pneumatic cylinder assemblies, generally illustrated as 212 and pivotally secured to the base 206, more specifically to the base shoulder 206b of the base 206. The wire changer 208 of FIGS. 3A–3H more specifically includes pneumatic cylinder assemblies 212a, 212b, 212c and 212d. Each of the pneumatic cylinder assemblies 212a, 212b, 212c and 212d has a pneumatic valve (not shown) to supply air for operation. Pneumatic cylinder assemblies 212a, 212b, 212c and 212d respectively include cylinder ports 210a, 210b, 210c and 210d and cylinder rods 216a, 216b, 216c and 210d, respectively. Air for operation of the pneumatic cylinder assemblies 212a, 212b, 212c and 212d respectively pass through cylinder ports 210a, 210b, 210c and 210d. Rod-receiving recesses 207a, 207b, 207c and 207d of lips 211a, 211b, 211c and 211d removably receive ends of cylinder rods 216a, 216b, 216c and 216d, respectively when the correspondingly associated pneumatic cylinder assembly (i.e., pneumatic cylinder 212a or 212b or 212c and 212d) is pneumatically actuated. The pneumatic cylinder assemblies 212a, 212b, 212c and 212d also include cylinder brackets (or clevises) 212a, 214b, 214c and 214d.

The cylinder brackets 214a, 214b, 214c and 214d comprise clevis bases 215a, 215b, 215c and 215d, respectively, as best shown in FIG. 3H. Clevis bases 215a, 215b, 215c and 215d in turn have clevis arms 217a—217a, 217b—217b, 217c—217c and 217d—217d, bound thereto and extending therefrom such that slots 219a, 219b, 219c and 219d are respectively formed therebetween. Clevis arms 217a—217a, 217b—217b, 217c—217c and 217d—217d respectively pivotally attach to base shoulder 206b of the base 206 via a bracket pin 296. Lips 211a, 211b, 211c and 211d slidably lodge in slots 219a, 219b, 219c and 219d, respectively.

Figure 9:
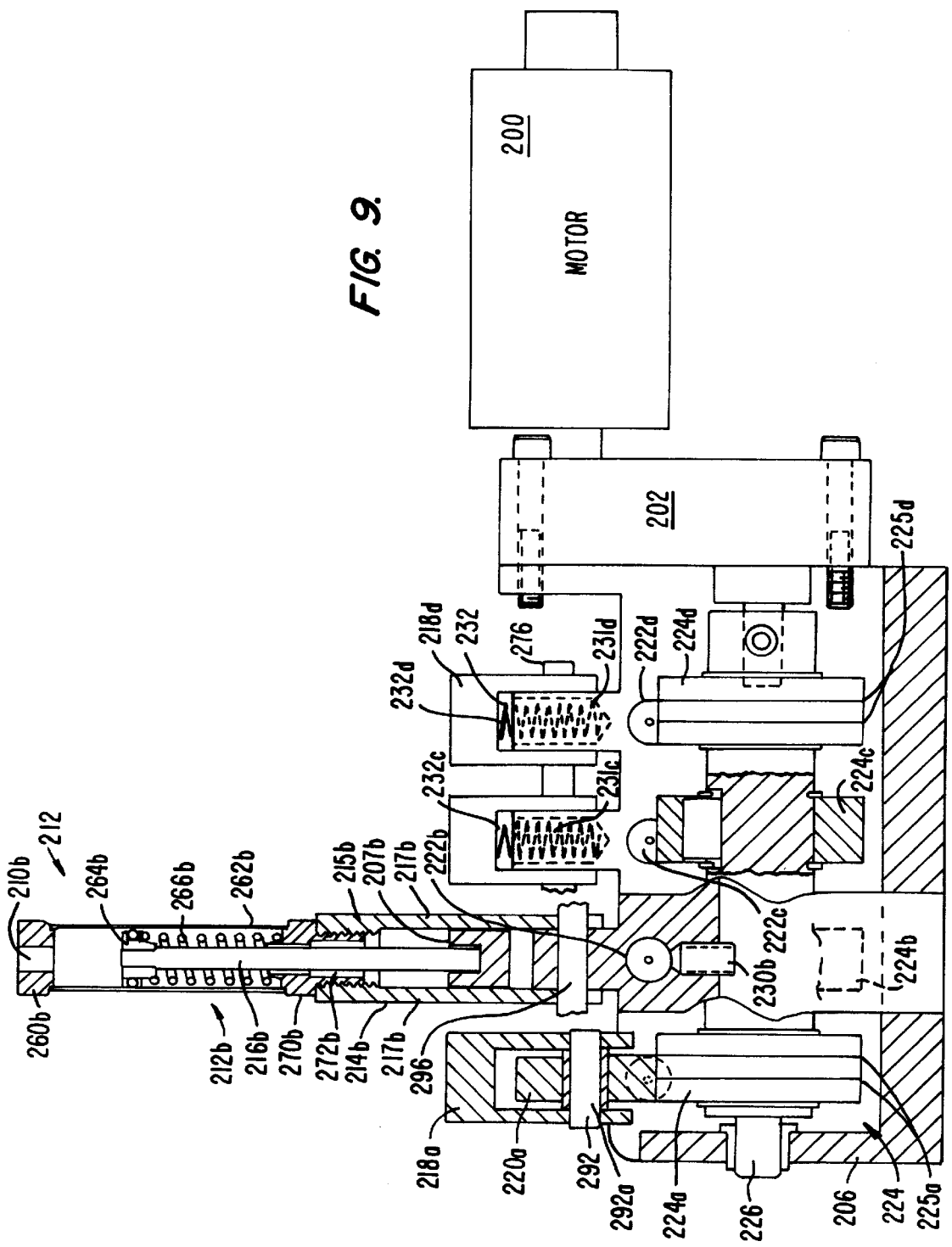
FIG. 9 is a partial vertical sectional view of the wire changer assembly of FIG. 3A including one of the pneumatic cylinder assemblies including a motor coupled to a drive shaft by a gear assembly enclosed within a gear box.

As best shown in FIG. 9, pneumatic cylinder assembly 212b additionally has a cylinder barrel 262b supporting an end cap 260b wherethrough the cylinder port 210b extends. Pneumatic cylinder assembly 212b also has a rod end 270b threadably connected to the cylinder bracket 214b, more specifically to the clevis base 215b of the cylinder bracket 214b. A rod bushing 272b is seated in the rod end 270b. A piston 264b mounts to an end of the cylinder rod 216b which slidably passes through an opening (i.e., a clevis opening) both in the rod end 270b and in the rod bushing 272b. A cylinder spring member 266b helically surrounds the cylinder rod 216b between the piston 264b and the rod end 270b.

In order to move the cylinder rod 216b downwardly to slidably seat into the rod-receiving recess 207b for moving the pinch-roller arm 218b downwardly and causing the pinch-roller 220b to place the welding wire 216b in driving engagement with the drive wheel 224, compressed air is pneumatically introduced through the cylinder port 210b to place pressure on top of the piston 264b and cause the piston 264b (including cylinder rod 216b secured thereto) to commence moving downwardly. Cylinder spring member 266b, as well as spring member 232b, begins to compress. Seal 264b and cylinder rod 216b continue to move downwardly until pinch-roller 220b contacts the drive wheel 224 and has placed welding wire 216b in driving engagement with the drive wheel 224. Cylinder spring member 266b and spring member 232b are both in a compressed state and welding wire 16b is now moving in the direction of rotation of the drive wheel 224. More specifically, welding wire 16b is either moving towards the wire feeder 19 or away from the wire feeder 19, depending on the direction of rotation of the reversible motor 200.

To release the pinch-roller 220b from contact with the drive wheel 224 including the placement of welding wire 216b in driving engagement with the drive wheel 224, air pressure on the piston 264b is released, which enables the cylinder spring member 266b to expand and move the piston 264b and the attached cylinder rod 216b upwardly, causing the cylinder rod 216b to release its downward force on the pinch-roller arm 218c, more specifically on the lip 211b of the pinch-roller arm 218b. This enables spring member 232b to expand from its compressed state and move the pinch-roller arm 218b away from the base 206, which in turn moves the pinch-roller 220b away from the drive wheel 224 for releasing the welding wire 16b from being in driving engagement with the drive wheel 224.

Each of the pneumatic cylinder assemblies 212a, 212c, and 212d, while not specifically shown, has identical internals (e.g., a piston, such as piston 264b; a cylinder spring member, such as cylinder spring member 266b, etc.) as those immediately set forth and described with respect to pneumatic cylinder assembly 212b. Also, while not specifically described, each of the pneumatic cylinder assemblies 212a, 212c and 212d operate in the same manner as pneumatic cylinder assembly 212b. Thus, if it is desired to change from welding wire 16a to welding wire 16c, pneumatic cylinder assembly 212a is initially released from its actuated position of FIGS. 3C and 3E by releasing air pressure that is being transmitted thereto through its associated cylinder port 210a, and then air pressure is subsequently transmitted to the pneumatic cylinder assembly 212c to cause pinch-roller arm 218c to be driven downwardly for causing the associated pinch-roller 220c to place welding wire 16c in a driving engagement on the drive wheel 224. A more specific description as to how pneumatic cylinder assembly 217a causes welding wire 16a to be released from a driving engagement with the drive wheel 224 would be the same description that was previously stated with respect as to how pneumatic cylinder assembly 212b releases welding wire 16b from a driving engagement with the drive wheel 224. Also, a more specific description as to how pneumatic cylinder assembly 212c causes welding wire 16c to be placed in a driving engagement with the drive wheel 224 would be the same description that was previously stated with respect as to how pneumatic cylinder assembly 212b causes welding wire 16b to be placed in a driving engagement with the drive wheel 224. Only one of the pneumatic cylinder assemblies 212 would be actuated at any particular time, with the remaining pneumatic cylinder assemblies 212 being in a released state where their associated respective pinch-roller assemblies 204 are retracted. During the welding procedure where the wire feeder 19 is engaged to a selected welding wire 16 and is pulling the selected welding wire 16 off its associated spool (e.g. spool 18a), all pneumatic cylinder assemblies 212 are released from their actuated position which causes all of the associated pinch-roller assemblies 204 to be retracted. Thus, the selected welding wire 16 is being pulled by the wire feeder 19 through the wire changer 208.

The base shoulder 206a has a bore 421a and an opening 423a communicating with the bore 421a (see FIG. 3E). Similarly, base shoulder 206b has a bore 421b and an opening 423b communicating with the bore 421b. Wire guide conduits 222a and 222a are generally concentrically disposed in bores 421a and 421b, respectively. Set screws 230a and 230a rotatably lodge in openings 423a and 423b. Base shoulders 206a and 206b have additional bores (not shown) and openings, also not shown) for receiving wire guide conduits 222b—222b, 222c—222c and 222d—222d (see FIGS. 3A and 3H), and set screws 230b—230b, 230c—230c, and 230d, respectively. The purpose of the wire guide conduits 222a, 222b, 222c and 212d is to respectively position welding wires 16a, 16b, 16c and 16d in alignment with the respective pinch-rollers 220a, 220b, 220c and 220d, and the drive wheel 224. In the embodiment of the invention shown in FIGS. 7 and 9, the drive wheel 224 consists of four separate drive wheels 224a, 224b, 224c and 224d, all mounted on the drive wheel axle 226. For the embodiment of the invention illustrated in FIGS. 7 and 9, the wire guide conduits 222a, 222b, 222c and 212d would position welding wires 16a, 16b, 16c and 162d, respectively, in alignment with pinch-roller/drive wheel pairs 220a/224a, 220b/224b, 220c/224c and 220d/224d, respectively.

As best shown in FIGS. 3F and 3G, wire guide conduits 222a—222a are preferably located such that welding wire 16a does not contact the drive wheel 224 when the pinch-roller assembly 204a is released by the pneumatic cylinder assembly 212a. The remaining wire guide conduits 222b, 222c and 222c are preferably similarly situated with respect to welding wires 16b, 16c and 16d when pinch-roller assemblies 204b, 204c and 204d, respectively, are released by the respective pneumatic cylinder assemblies 212b, 212c, and 212d. The set screws 230a, 230b, 230c and 230d are used to situate and/or adjust the welding wire guide conduits 222a, 222b, 222c and 222d such that respective welding wires 16a, 16b, 16c and 16d do not contact the drive wheel 224 when not being in a driving engagement with same. The reason for removing welding wires 16 from engagement with the drive wheel 224 when not being driven by same is to prevent wear and erosion of the drive wheel 224, as welding wires 16 are being pulled by the wire feeder 19 from their associated spools through the wire changer 208. Obviously, if a particular welding wire 16 is in contact with the drive wheel 224 when being pulled by wire feeder 19, after a pinch-roller assembly 204 has been released from having placed the particular welding wire 16 in a driving engagement with the drive wheel 224, there will be wear and erosion on the surface of the drive wheel 224 at the point of frictional contact of the particular welding wire 16 with the surface of the drive wheel 224. During the welding process when the wire feeder 19 is feeding a selected welding wire 16 through the whip assembly 10 to a welding gun assembly, the wire feeder 19 is pulling the selected welding wire 16 from its associated spool through the wire changer 208. If the selected welding wire 16 is in contact with a stationary drive wheel 224 when being pulled through the wire changer 208, there will be erosion on the surface of the drive wheel 224 at the point of contact of the moving selected welding wire 16 and the stationary drive wheel 224.

Figure 34:
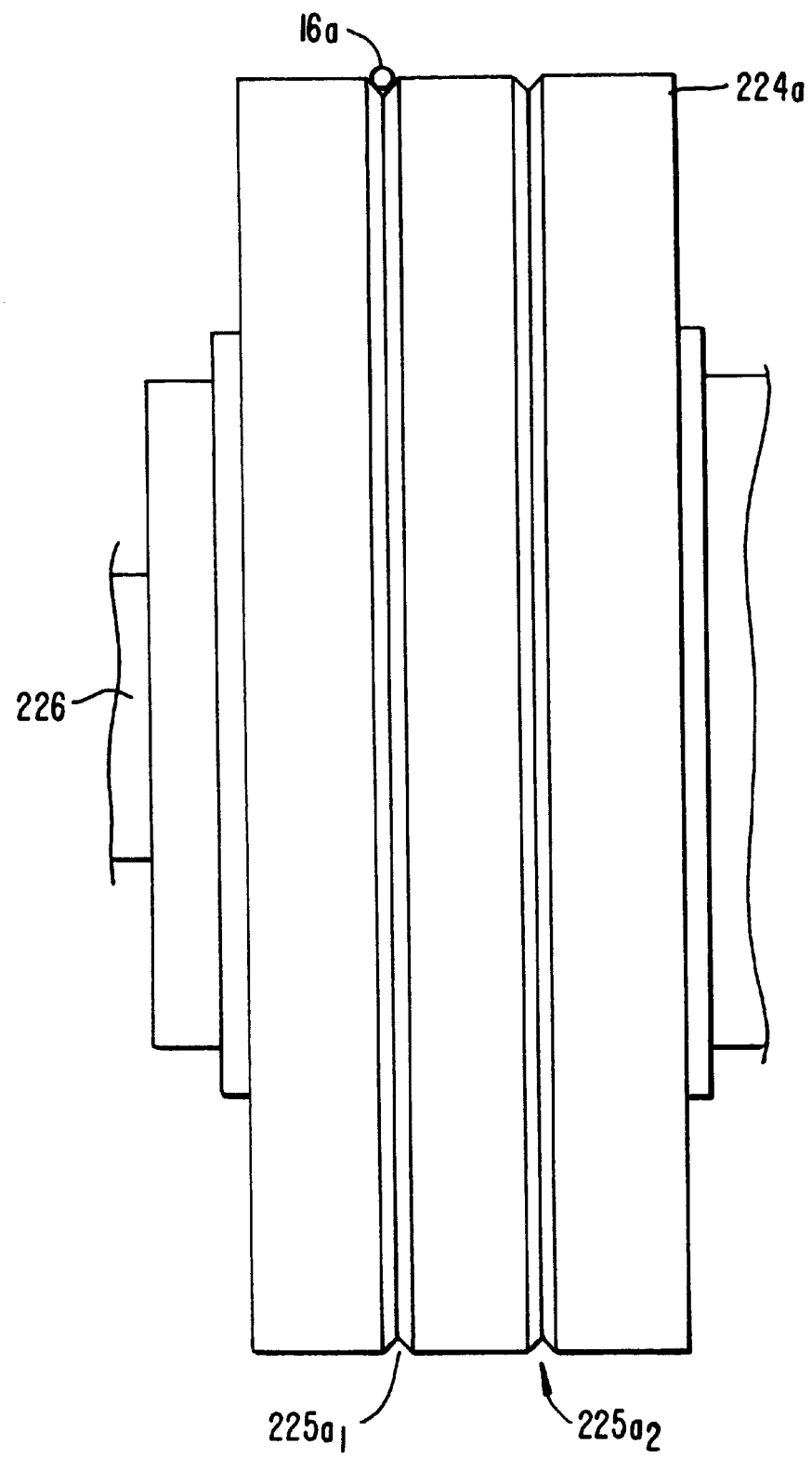
FIG. 34 is an enlarged side elevational view of one of the drive wheels of FIG. 7.

In a preferred embodiment of the present invention, the drive wheel 224 has a plurality of wire grooves, generally illustrated as 225, where welding wires 16 lodge after having been disposed therein by the pinch-roller assemblies 204 for frictional driving engagement with the drive wheel 224. More specifically and as best shown in FIG. 6, a single drive wheel 224 is seen as having wire grooves 225a, 225b, 225c and 225d which respectively receive and frictionally engage welding wires 16a, 16b, 16c and 16d when respectively placed therein by pinch-roller assemblies 204a, 204b, 204c, and 204d. For the embodiment of the invention illustrated in FIGS. 7 and 9, each of the drive wheels 224a, 224b, 224c and 224d has a pair of wire grooves 225. More specifically, drive wheel 224a has wire grooves $225a_1$ and $225a_2$, as best shown in FIG. 34. Similarly, and as shown in FIGS. 7 and 9, drive wheels 224b, 224c and 224d have wire grooves 225b—225b, 225c—225c, and 225d—225d, respectively. When one of the grooves 225 on the respective wheels 224 becomes worn, the respective wheels 224 can be removed from the drive axle 226 and reversed (i.e., pivoted 180° about their associated vertical axis) and placed back on the drive axle 226 so that the other groove 225 can be used. Thus, and with respect to the enlarged side elevational view of drive wheel 224 in FIG. 34, if wire groove 225a, of drive wheel 224a becomes worn and less frictional, drive wheel 224a may be removed from the drive wheel axle 226, rotated 180° around its vertical axis, and replaced on the drive wheel axle 226. After such a rotation procedure, wire groove $225a_2$ would replace the position of wire groove $225a_1$ in FIG. 34. Welding wire 16a would then be placed in driving engagement with drive wheel 224a in wire groove $225a_2$. The drive wheel 224 with a pair of wire grooves 225 is available commercially from Miller Electric Mfg. Co., P.O. Box 1079, Appleton, Wis. 54912.

Referring in detail now to FIGS. 4A–4H, there is seen another preferred embodiment of the wire changer 208. This embodiment of the wire changer 208 differs from the embodiment of FIGS. 3A–3G in that an adjustable spring assembly, generally illustrated as 600, is employed for each of the pinch-roller assemblies 204 for continually biasing each of the pinch-roller arms 218 downwardly, causing each of the associated pinch rollers 220 to engage and hold one of the welding wires 16 in driving engagement with the drive wheel 224. Each of the associated pinch rollers 220 is released from having placed one of the associated welding wires 16 in a driving engagement with the drive wheel 224 by one of a plurality of pneumatic cylinder assemblies, generally illustrated as 700. Each of the pneumatic cylinder assemblies 700 is supported by one of the pinch-roller arms 218 for moving that pinch-roller arm 218 away from the base 206 to cause the pinch roller 220 associated with that pinch-roller arm 218 to disengage and release one of the welding wires 16 from a driving engagement with the drive wheel 224. The embodiment of the wire changer 208 in FIGS. 4A–4H differs from the embodiment of the wire changer 208 in FIGS. 3A–3H in that spring members 232 are not employed because they are not needed, as the moving of each of the pinch-roller arms 218 away from the base 206 is done by one of the associated pneumatic cylinder assemblies 700 and not by one of the spring members 232. Furthermore, and as will be explained hereinafter, the structure of the pinch-roller arms 218 in the embodiment of the invention illustrated in FIGS. 4A–4H differs from the pinch-roller arms 218 for the embodiment of the invention illustrated in FIGS. 3A–3H.

Continuing to refer in detail to FIGS. 4A–4H for a more specific description of the adjustable spring assemblies 600 and the pneumatic cylinder assemblies 700, there is seen adjustable spring assemblies 600a, 600b, 600c and 600d, all of which pivotally connect to the base 206, more specifically to the base shoulder 206b of the base 206. Adjustable spring assemblies 600a, 600b, 600c and 600d respectively include the following: shafts 602a, 602b, 602c and 602d pivotally connected to base shoulder 206b; spring cups 604a, 604b, 604c and 604d respectively slidably disposed on shafts 602a, 602b, 602c and 602d; adjusting nuts 608a, 608b, 608c and 608d respectively threadably engaged to the shafts 604a, 604b, 604c and 604d; and spring members 612a, 612b, 612c and 612d respectively helically surrounding the shafts 602a, 602b, 602c and 602d between the respective adjusting nuts 608a, 608b, 608c and 608d and spring cups 604a, 604b, 604c and 604d.

Figure 4A:
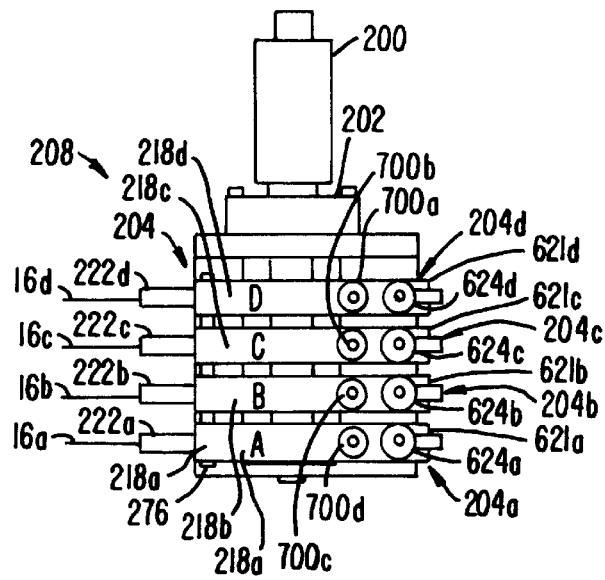
FIG. 4A is top plan view of another embodiment of the wire changer assembly of the present invention having a plurality of pinch-roller assemblies pivoted and connected to the base with each pinch-roller assembly having associated therewith a spring-biasing assembly for biasing the pinch-roller assembly downwardly and towards the base and a pneumatic cylinder assembly for moving the pinch-roller assembly upwardly or upwardly and away from the base when activated.

Each of the pinch roller arms 218 terminates in a bifurcated structure, generally illustrated as 620, with each bifurcated structure 620 having an arm slot 624 wherein one of the shafts 602 is removably disposed. More specifically and as best shown in FIGS. 4A and 4H, pinch-roller arms 218a, 218b, 218c and 218d respectively terminate in bifurcated structures 620a, 620b, 620c and 620d having generally parallel arms 621a—621a, 621b—621b, 621c—621c and 621d—621d, respectively, wherebetween arm slots 624a, 624b, 624c and 624d are respectively defined. Shafts 602a, 602b, 602c and 602d removably pivot into arm slots 624a, 624b, 624c and 624d, respectively.

As best shown in FIG. 4H, arms 621a—621a, 621b—621b, 621c—621c and 621d—621d respectively have generally arcuate surfaces 630a—630a, 630b—630b, 630c—630c and 630d—630d for engaging respective spring cups 604a, 604b, 604c and 604d when respective shafts 602a, 602b, 602c, and 602d are pivoted towards the respective pinch-roller arms 618a, 618b, 618c and 618d and into the respective arm slots 624a, 624b, 624c and 624d. More specifically, arcuate surfaces 630a—630a, 630b—630b, 630c—630c and 630d—630d respectively engage and facilitate the sliding of the spring cups 604a, 604b, 604c and 604d along respective shafts 602a, 602b, 602c, and 602d and towards respective adjusting nuts 608a, 608b, 608c and 608d for compressing the respective spring members 612a, 612b, 612c and 612d between respective spring cups 604a, 604b, 604c and 604d and respective adjusting nuts 608a, 608b, 608c and 608d.

The expansion force of the compressed spring members 612a, 612b, 612c and 612d is what continually biases pinch-roller arms 218a, 218b, 218c and 218d downwardly, causing respective associated pinch rollers 220a, 220b, 220c and 220d to respectively engage and hold welding wires 16a, 16b, 16c and 16d in a driving engagement with the drive wheel 224. As was previously indicated, pneumatic cylinder assemblies 700 may be used for moving pinch-roller arms 218 away from the base 206 and against the expansion-force bias of the spring members 612 to further compress spring members 612 and cause associated pinch rollers 220 to disengage and release welding wires 16 from a driving engagement with the drive wheel 224. To conduct such a procedure, pneumatic cylinder assemblies 700 are actuated, which releases the pinch-roller arms 218 associated therewith. Thus, for the preferred embodiment of the invention illustrated in FIGS. 4A–4H, the pneumatic cylinder assemblies 700 perform a diametrically opposite function with respect to the pinch-roller arms 218 than the pneumatic cylinder assemblies 212 in the preferred embodiment of the invention illustrated in FIGS. 3A–3H. For the preferred embodiment of the invention represented in FIGS. 4A–4H, actuation of one of the pneumatic cylinder assemblies 700 by transmission of air pressure thereto causes one of the pinch-roller arms 218 associated therewith to move away from the base 206 and release its associated pinch roller 220 from the placing of one of the welding wires 16 in a driving engagement with the drive wheel 224. For the preferred embodiment of the invention represented in FIGS. 3A–3H, actuation of one of the pneumatic cylinder assemblies 212 causes one of the pinch-roller arms 218 associated therewith to move downwardly and towards the base 206 such that its associated pinch roller 220 contacts one of the welding wires 16 and places it in a driving engagement with the drive wheel 224.

Figure 4B:
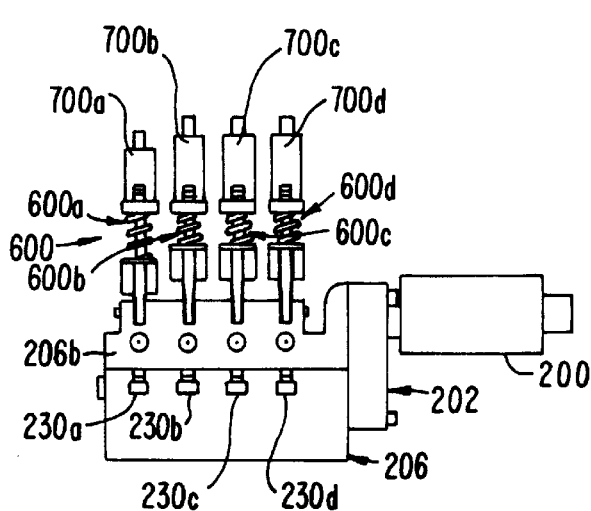
FIG. 4B is a side elevational view of the wire changer assembly of FIG. 4A.
Figure 4C:
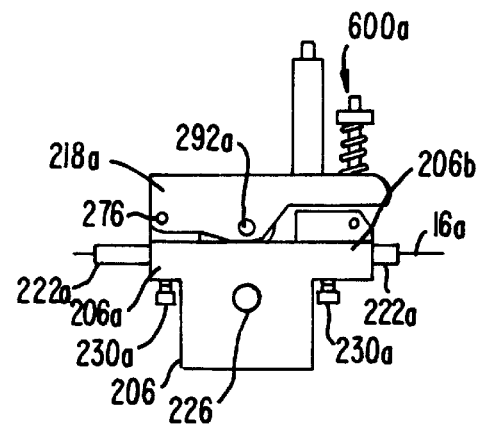
FIG. 4C is an end elevational view of the wire changer assembly of FIG. 4A with a pinch-roller assembly being biased downwardly by the spring-biasing assembly and with the pneumatic cylinder associated with the pinch-roller assembly being nonactuated.
Figure 4D:
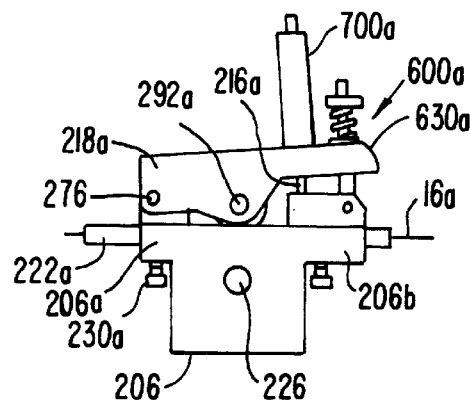
FIG. 4D is an end elevational view of the wire changer assembly of FIG. 4A having a pinch-roller assembly pivoted upwardly by an actuated pneumatic cylinder assembly such as to compress a spring in the spring-biasing assembly.
Figure 4E:
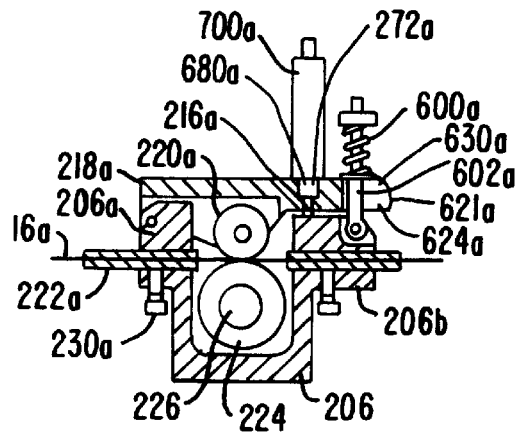
FIG. 4E is a vertical sectional view of the wire changer assembly including the pinch-roller assembly of FIG. 4C.
Figure 4F:
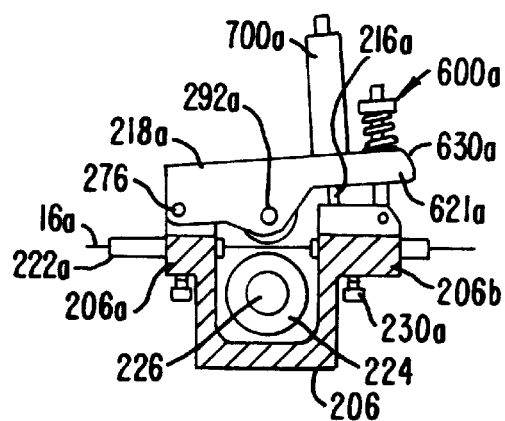
FIG. 4F is a partial vertical sectional view of the wire changer assembly including the pinch-roll assembly of FIG. 4D.
Figure 4G:
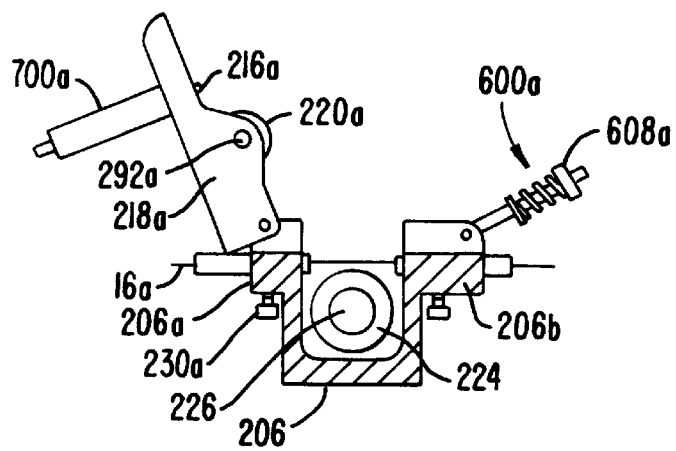
FIG. 4G is a partial vertical sectional view of the wire changer assembly of FIG. 4A having one of the pinch-roll assemblies pivoted into an oblique position with respect to the base of the wire changer assembly in order to expose the drive wheel and a welding wire passing through the wire changer assembly.
Figure 4H:
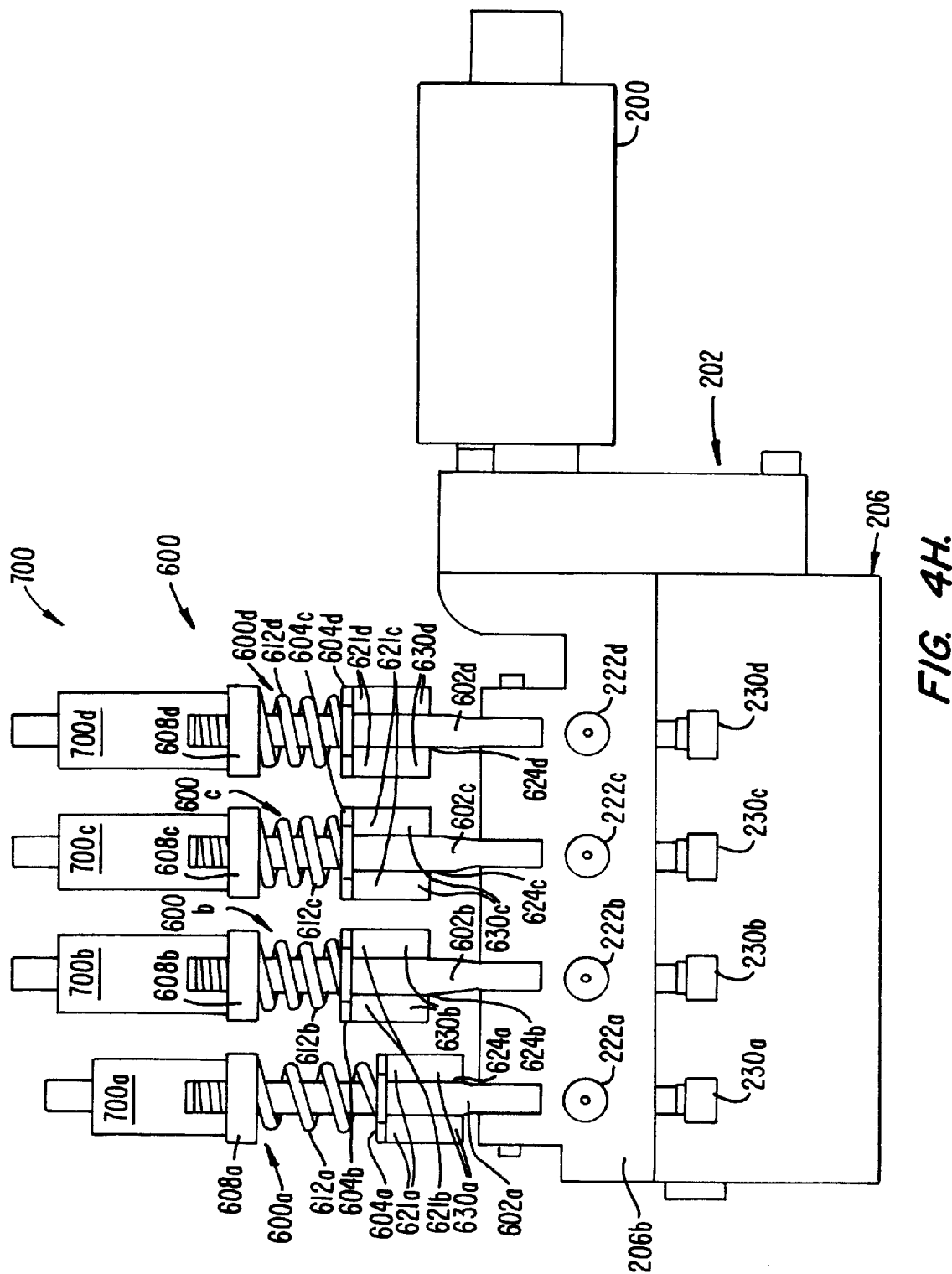
FIG. 4H is an exploded view of the side elevational view of FIG. 4B.

Continuing to refer to FIGS. 4A–4H for a description is of the pneumatic cylinder assemblies 700 and how the pinch-roller arms 218 are modified to accommodate the pneumatic cylinder assemblies 700, there is seen in FIGS. 4B and 4H pneumatic cylinder assemblies 700a, 700b, 700c, and 700d which are respectively supported by pinch-roller arms 218a, 218b, 218c, and 218d. Actuation of the pneumatic cylinder assemblies 700a, 700b, 700c and 700d respectively causes the pinch-roller arms 218a, 218b, 218c and 218d to be released and pivot away from the base 206. The pneumatic cylinder assemblies 700 are essentially identical to pneumatic cylinder assemblies 212 but without the cylinder brackets (e.g. cylinder brackets 214a, 214b, etc.) which are not needed for this embodiment of the invention. Therefore, while not specifically described, it is to be understood that the internals of the pneumatic cylinder assemblies 700 are the same as the internals for the pneumatic cylinder assemblies 212. Thus, each of the pneumatic cylinder assemblies 700a, 700b, 700c and 700d has a seal, such as seal 264b, a cylinder spring member, such as cylinder spring member 266b, a rod bushing, such as rod bushing 272a, etc. Also, while not specifically described, pneumatic cylinder assemblies 700 operate in the same manner as pneumatic cylinder assemblies 212.

As best seen in FIG. 4E, pinch-roller arm 218a has an arm opening 680a wherein the rod bushing 272a of the pneumatic cylinder assembly 700a fixedly lodges to support the latter in a generally upright posture as shown in FIG. 4E. For this embodiment of the invention, the rod-receiving recess 207a in the pinch-roller arm 218a of FIGS. 3A–3H has been replaced by the arm opening 680a. When pneumatic cylinder assembly 700a is actuated, cylinder rod 216a is driven downwardly from pressurized air, causing the pinch-roller arm 218a to pivot upwardly about the arm pin 276 and away from the base 206. This in turn causes the pinch-roller 220a to move away from the drive wheel 224 and release the welding wire 16a from being in a driving engagement with the drive wheel 224. Each of the pinch-roller arms 218b, 218c, and 218d, while not specifically shown, has arm openings which are identical to arm opening 680a wherein the rod bushings of the pneumatic cylinder assemblies 700b, 700c and 700d respectively fixedly lodge to support the pneumatic cylinder assemblies 700b, 700c and 700d in a generally upright posture as shown in FIGS. 4B and 4H. Pneumatic cylinder assemblies 700b, 700c and 700d would operate in a manner similar to pneumatic cylinder assembly 700a, with cylinder rods (such as cylinder rod 216a) being driven downwardly from pressurized air, causing the respective pinch-roller arms 218b, 218c and 218d to pivot upwardly about the arm pin 276 and away from the base 206, to respectively cause associated pinch-rollers 220b, 220c and 220d to move away from the drive wheel 224 and respectively release welding wires 16b, 16c and 16d from being in a driving engagement with the drive wheel 224. In operation of this embodiment of the invention, only one of the pneumatic cylinder assemblies 700 would be deactivated at any particular time, with the remaining pneumatic cylinder assemblies 700 being in an actuated state where their associated respective pinch-roller assemblies 204 are retracted.

After one of the welding wires 16 (e.g. welding wire 16a or welding wire 16b, etc.) has been selected by the wire change 208 of the present invention, the selected welding wire 16 is moved by the wire changer 208 to the wire feeder 19 for feeding through a whip assembly, such as whip assembly 10, and subsequently to a welding gun assembly, such as welding gun assembly 7 (see FIG. 1) or a robot type welding gun assembly, generally illustrated as 890 in FIG. 28. To assist the selected welding wire 16 for entering the wire feeder 19, a centering or aligning assembly, generally illustrated as 300, is provided. As best shown in FIGS. 22A–29, the aligning assembly 300 is connected to and supported by the wire feeder 19, more specifically, by the inlet guide 102a (see FIG. 2C) of the wire feeder 19. The aligning assembly 300 has a number of preferred embodiments, all of which function to allow the passage of a single welding wire 16 (e.g. welding wire 16a, or welding wire 16b, or etc.) into the wire feeder 19 for subsequent transmission through a whip assembly, such as whip assembly 10.

Figure 10:
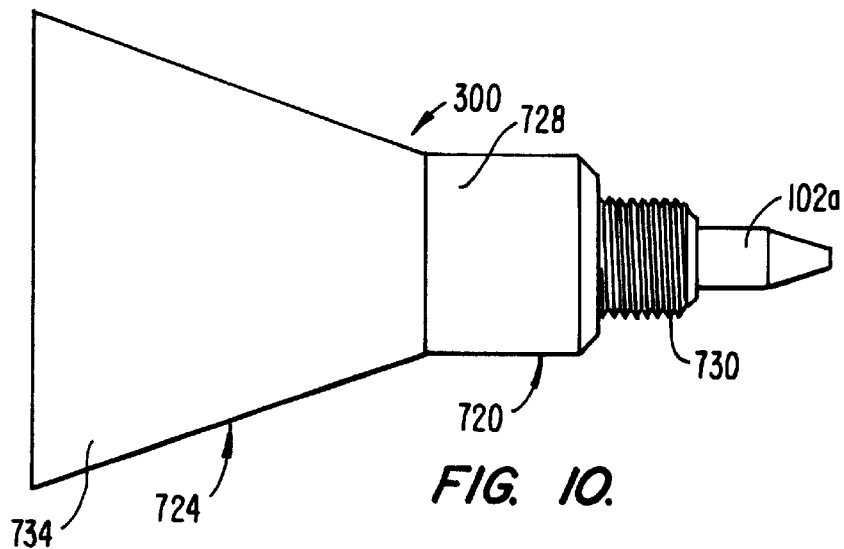
FIG. 10 is a side elevational view of one of the aligning assemblies in the form of a funnel-shaped cone member.
Figure 11:
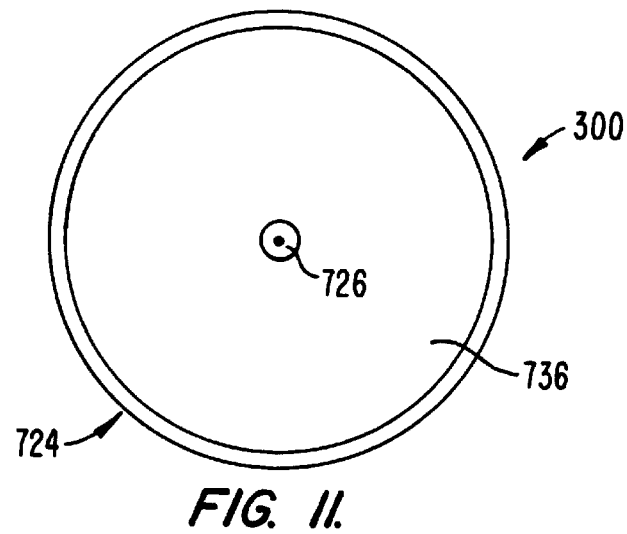
FIG. 11 is an end elevational view of the funnel-shaped cone member of FIG. 10.
Figure 12:
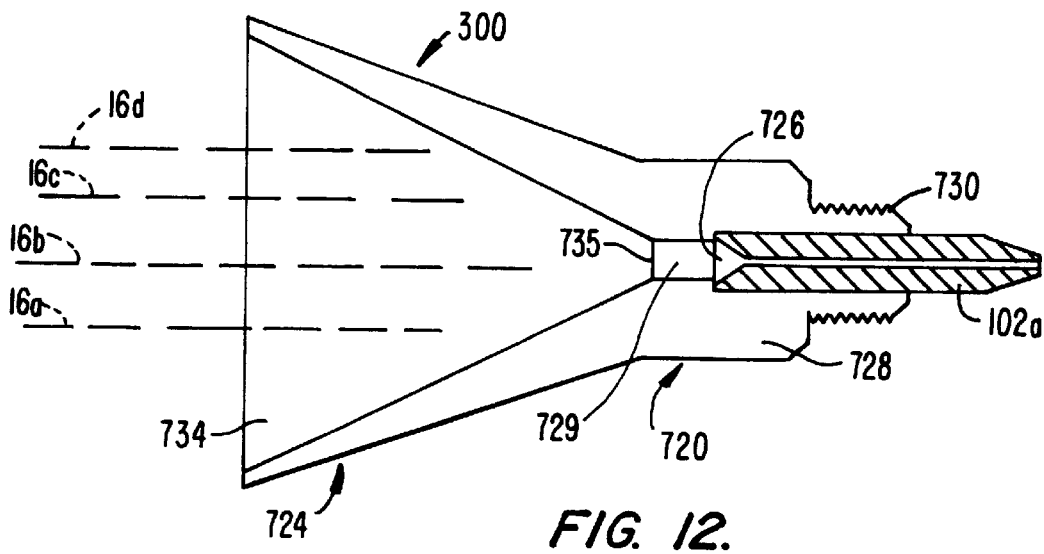
FIG. 12 is a partial vertical sectional view through the funnel-shaped cone member of the FIG. 10 disclosing a converging zone communicating with a wire guide that is capable of only passing a single welding wire therethrough.

The aligning assembly 300, as best shown in FIGS. 10–21, has a converging-zone assembly, generally illustrated as 720, and a lead-in-zone assembly, generally illustrated as 724. The converging-zone assembly 720 removably connects to the inlet guide 102a of the wire feeder 19. The inlet guide 102a is formed with a funnel-shaped opening 726 for receiving and allowing the transmission through the inlet guide 102a of a single welding wire 16. In the preferred embodiment of the aligning assembly 300 shown in FIGS. 10–12, the converging-zone assembly 720 includes a cylindrical member 728 formed with a cylindrical bore 729 which communicates with the funnel-shaped opening 726 of the inlet guide 102a. The cylindrical member 728 is also formed with a threaded section 730 which threadably engages the wire feeder 19, more specifically, the inlet guide assembly 102 of the wire feeder 19. As best shown in FIGS. 10 and 12, the lead-in-zone assembly 724 comprises a funnel-shaped cone member 734 integrally bound to the cylindrical member 728. The funnel-shaped cone member 734 terminates in a cone opening 735 which defines an inlet opening for the cylindrical bore 729 of the cylindrical member 728.

Figure 13:
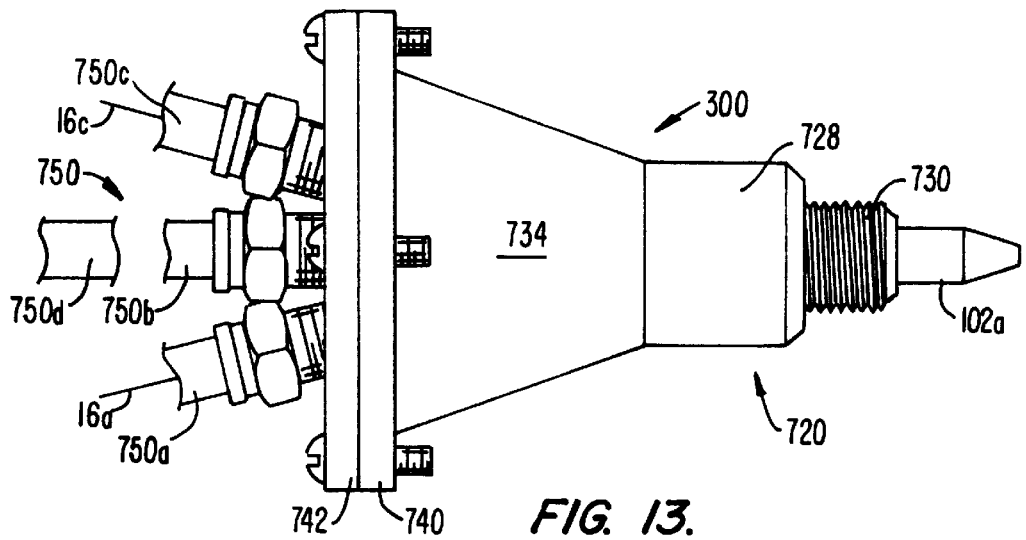
FIG. 13 is a side elevational view of another embodiment of the aligning assembly in the form of a funnel-shaped cone having a cover plate secured thereto with a plurality of conduits releasably connected to the cover plate such that the welding wire associated with each conduit is capable of being passed into the funnel-shaped cone member.
Figure 14:
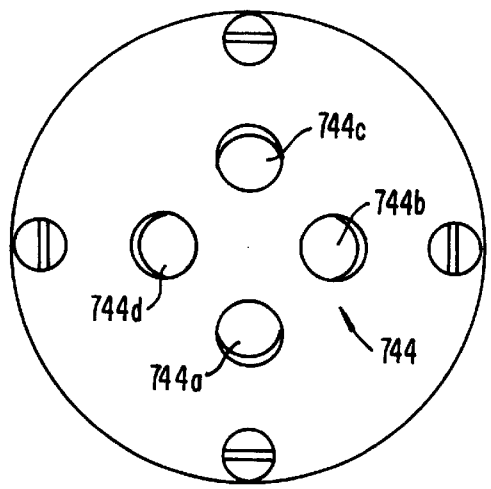
FIG. 14 is a front elevational view of the cover plate disclosed in FIG. 13.
Figure 15:
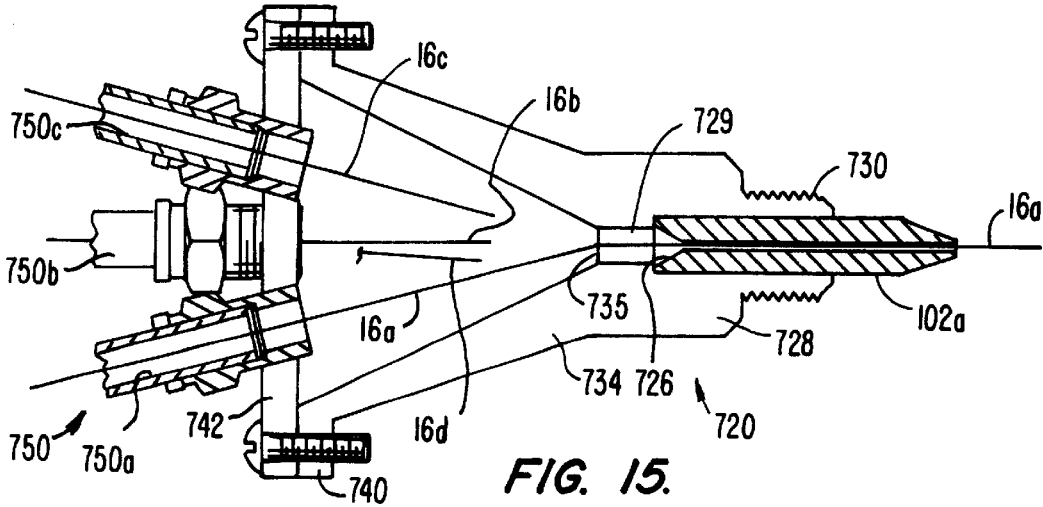
FIG. 15 is a vertical sectional view of the aligning assembly of FIG. 13 illustrating a welding wire extending from each of the conduits into the funnel-shaped cone member with one of the welding wires extending through the converging zone and through the wire guide.

For the embodiment of the aligning assembly in FIGS. 13–15, the funnel-shaped cone member 734 is formed with a flanged lip 740. A cover plate 742 is coupled to the flanged lip 740 of the funnel-shaped cone member 734. The cover plate 742 includes a plurality of plate openings 744 which communicate with a conduit assembly 750. The plate openings 744 more specifically include openings 744a, 744b, 744c and 744d (see FIG. 14). The conduit assembly 750 comprises conduits 750a, 750b, 750c and 750d which connect to the cover plate 742 such as to respectively communicate with openings 744a, 744b, 744c, and 744d. Conduits 744a, 744b, 744c, and 744d are aligned with and/or communicate with wire guide conduits 222a, 222b, 222c, and 222d, respectively, of the wire changer 208 for receiving and providing a passage for welding wires 16a, 16b, 16c and 16d, respectively. As best shown in FIG. 15, welding wires 16 (i.e. 16a, 16b, 16c and 16d) are passed into the funnel-shaped cone member 734 Assuming that welding wire 16a is a selected welding wire, then reversible motor 200, in conjunction with the pinch-roller assembly 204a and the drive wheel 224, propel welding wire 16a through the following in the order stated: core opening 735, the cylindrical bore 729, the funnel-shaped opening 726 of the inlet guide 102a, and the inlet guide 102a of the wire feeder 19. As previously indicated, wire feeder 19 would then subsequently propel or move welding wire 16a through the whip assembly 10 and then to a suitable welding gun assembly.

In the event that it is desired to change from welding wire 16a to welding wire 16b, the welding-wire movement through the wire feeder 19 and the wire changer 208 is reversed, i.e. the drive direction of reversible motor 54 and reversible motor 200 is reversed. Welding 16a is withdrawn from the whip assembly 10 by the reversible motor 54 rotating the drive gear 106 and the drive rolls 104—104 in a direction which is reversed from the feeding direction. After welding 16a has passed the last drive roll 104 of the wire feeder 19, the drive wheel 224 of the wire changer 208 is in driving engagement with welding wire 16a and reversible motor 200 rotates drive wheel 224 to cause welding wire 16a to move out of the inlet guide 102a until welding wire 16a is in the funnel-shaped cone member 734. Subsequently, pinch-roller assembly 204a is released from engagement with welding wire 16a and then welding wire 16b is selected by the wire changer 208 which is accomplished by pinch-roller assembly 204b placing welding wire 16b in a driving engagement with the drive wheel 224. After welding wire 16b has been selected, the drive direction of reversible motor 200 is set such as to cause the drive wheel 224 to move welding wire 16b through the following: opening 735, cylindrical bore 729, funnel-shaped opening 726, and inlet guide 102a. After welding wire 16b has moved through inlet guide 102a, the first drive roll 104 of the wire feeder 19 engages the welding wire 16b. Thereafter, the drive direction of the motor 54 is such that the wire feeder 19 commences to propel and move welding wire 16b through the whip assembly 10 and to the suitable welding gun assembly.

For the embodiment of the invention of FIGS. 10–12 where no conduit assembly 750 is employed, the welding wires 16a, 16b, 16c, and 16d remain within the funnel-shaped cone member 734. Because there is no conduit assembly 750, the aligning assembly 300 of FIGS. 10–12 is preferably employed where welding wires 16 have a high column strength and where the wire changer 208 may be mounted in proximity to the funnel-shaped cone member 734. For such a disposition, welding wires 16 generally remain intersected with the funnel-shaped cone 734, and after a particularly welding wire 16 has been selected and begins to move, the associated inwardly sloping surfaces of the funnel-shaped cone member 734 directs the particularly selected welding wire 16 to the converging-zone assembly 720.

Referring now to FIGS. 16–18, there is seen another embodiment of the aligning assembly 300. The cylindrical member 728 for this embodiment of the aligning assembly 300 has a tube assembly 760 coupled thereto. Tube assembly 760 preferably comprises a tube 762 lodging in the cylindrical bore 729 of the cylindrical member 728 (see FIG. 18). Tube assembly 760 also comprises tubes 764, 766 and 768 which connect to and communicate with the tube 762. Tubes 762, 764, 766 and 768 respectively align with and/or communicate with wire guide conduits 222b, 222a, 222c, and 222d for providing passageways where respective welding wires 16b, 16a, 16c, and 16d pass. As best shown in FIGS. 17 and 18, because tubes 764, 766, and 768 connect to and communicate with tube 762, after welding wires 16a, 16c, and 16d have passed through respective tubes 764, 766, and 768, they are introduced into tube 762 for subsequent movement to the inlet guide 102a. Mitered joints, such as mitered joint 780 in tube 764, may be employed for all of the tubes of the tube assembly 760.

Referring now to FIGS. 19–21, there is seen yet another embodiment for the aligning assembly 300 of the present invention. This embodiment of the invention is particularly suited for when the welding wires 16 have a low column strength such that they are supported along the distance between the wire changer 208 and the aligning assembly 300. Stated alternatively, the aligning assembly 300 of FIGS. 19–21 provides close-tolerance passageways wherein welding wires 16 may supportedly move. For this embodiment of the aligning assembly 300, the cylindrical member 728 has a plurality of bores 728a, 728b, 728c, and 728d. Each of the bores (i.e. bores 728a, 728b, 728c, and 728d) taper in diameter towards the funnel-shaped opening 726 of the inlet guide 102a (see FIG. 21). A conduit assembly 784 couples to the cylindrical member 728.

The conduit assembly 784 for the embodiment of the aligning assembly 300 in FIGS. 19–21 comprises conduits 784a, 784b, 784c, and 784d which respectively slide into bores 728a, 728b, 728c, and 728d, as best shown in FIG. 21. A plurality of set screws 794a, 794b, 794c, and 794d rotatably pass into the cylindrical member 728 (see FIG. 21) for affixing the respective conduits 784a, 784b, 784c, and 784d within the respective bores 728a, 728b, 728c, and 728d. For this embodiment of the aligning assembly 300, the wire guide conduits (e.g. 222a, 222b, etc.) may be modified for coupling the conduits of the conduit assembly 784 to the wire changer 208 and for handling low column strength welding wires 16. By way of example only and as best shown in FIG. 21, there is seen vertical cross-sections of wire guide conduits 222a and 222c which respectively include enlarged bores 797a and 797c for slidably receiving conduits 784a and 784c, respectively. Wire guide conduits 222a and 222c are also respectively formed with funnel-shaped openings 798a and 798c for facilitating the receiving of respective welding wires 16a and 16c. The remaining wire guide conduits 222b and 222d would also be formed with similar bores, such as bores 797a and 797c, and with similar funnel-shaped openings, such as funnel-shaped openings 798a and 798c.

Referring now to FIG. 22A, there is seen a two-section wire changer 208 which has a pair of welding wires 16 from a spool assembly 18 engaged therewith. The aligning assembly 300 of FIGS. 10–12 is seen as mounted on the wire feeder 19. The two-section wire changer 208 employs pinch-roller assemblies 204a and 204b. The spool assembly 18 comprises spools 18a and spools 18b which respectively hold welding wires 16a and 16b in a position to be removed by the two-section wire changer 208. The aligning assembly 300 for this embodiment of the invention is preferably manufactured from a non-conductive material, such as plastic, rubber, etc.

Referring now to FIGS. 23–25 and 28–30, there is seen a barrel-type wire dereeler assembly, generally illustrated as 400. The dereeler assembly 400 comprises a wire barrel 400a and a wire barrel 400b for respectively housing spools 414a and 414b. Wire barrels 400a and 400b respectively include troughs 412a and 412b wherein loops of welding wires 16a and 16b may respectively lodge when movement of the welding wires 16a and 16b is reversed and is away from the wire changer 208. Spools 414a and 414b support welding wires 16a and 16b in a wound fashion. Dereeler bases 416a and 416b are supported by wire spools 414a and 414b. Conduit-shaped bearing housings 418a and 418b are respectively supported by dereeler bases 416a and 416b. Axles 422a and 422b removably lodge within respective bearing housings 418a and 418b and support respective sweep arms 406a and 406b. Bearing housings 418a and 418b include brake-adjustment members 420a and 420b for engaging axles 422a and 422b, respectively. As best shown in FIG. 23 and depending on which welding wire 16 (i.e. welding wire 16a or 16b) has been selected, as welding wire 16a or 16b is respectively pulled off wire spool 414a or 414b by the wire changer 208, the sweep arm 406a or 406b rotates in a desired direction (e.g. counterclockwise with respect to the top plan view in FIG. 23). Stated alternatively, sweep arms 406a and 406b sweep around the circumference of the respective wire barrels 400a and 400b as welding wires 16a and 16b are being pulled off wire spools 414a and 414b. Swivels 408a and 408b conveniently form a junction between sweep arms 406a and 406b and respective conduits 404a and 404b which provide respective passageways for welding wires 16a and 16b. Sweep arm 406a or 406b respectively swivels about swivel joint 408a or 408b as welding wire 16a or 16b is being pulled off spool 414a or 414b by the wire changer 208a. The brake-adjustment members 420a and 420b prevent the sweep arms 406a and 406b from over running when the movement of the respective welding wires 16a and 16b stops.

In FIG. 28, the robot type welding gun assembly 890 is seen as supporting the wire changer 208, the wire feeder 19, the whip assembly 10, the neck 5 and tip 3. A wire trimmer 892 including cutting blades 892a—892a may be employed for cutting or trimming an end of a welding wire 16. Robot type welding gun assembly 890 includes a base 894, an intermediate arm 896 pivotally secured to the base 894, an outer arm 898 pivotally secured to the intermediate arm 896, and a neck assembly 900 pivotally connected to the outer arm 898 and supporting the whip assembly 10.

Referring now to FIGS. 26 and 27, there is seen an assembly of dereelers, generally illustrated as 500, which includes dereeler assembly 500a and dereeler assembly 500b. Dereeler assemblies 500a and 500b respectively include reel stands 503a and 503b which rotatively support respective spools 505a and 505b. Brake assemblies 506a and 506b are respectively supported by the reel stands 503a and 503b for engaging wound welding wires 16a and 16b. The brake assemblies 506a and 506b (actually wire restraining devices) should be employed if the welding wires 16a and 16b are "springy" and tend to uncoil when the wire tension is released. The brake assemblies 506a and 506b are not intended to substantially impede the rotation of the spools 505a and 505b but are meant to hold the wires 16a and 16b in place. The working surface of the brake assemblies 506a and 506b could be a pad or a roller spanning the distance between the spool flanges. The brake assemblies 506a and 506b are released when the spools 505a and 505b are to furnish welding wires 16a and 16b for the welding process. If a spool (e.g. spool 505a or 505b) is not furnishing welding wire 16 (i.e. welding wire 16a or 16b), the brake assembly (i.e. brake assembly 506a or 506b) associated with that spool should be applied. The brake assemblies 506a and 506b are not meant to be a substitute for the existing friction brake (not shown) built into the dereeler assemblies 505a and 505b. Brake assemblies 506a and 506b shown in FIGS. 26 and 27 use a pneumatic cylinder to apply and retract the brake, but an adjustable spring could be used to apply the brake force and the cylinder would do the retracting. In either case the amount of brake force should be just enough to prevent the particular welding wire 16 from uncoiling. Brake assemblies 505a and 505b may also be conveniently hydraulically operated. Conduits 404a and 404b provide supported passageways for respective welding wires 16a and 16b.

The dereeler assemblies 500a and 500b additionally include containers 507a and 507b which are respectively coupled to the stands 503a and 503b. Containers 507a and 507b include accumulation zones 509a and 509b for accumulating respective welding wires 16a and 16b when a direction of movement of the welding wires (e.g. welding wires 16a or 16b) is towards its associated spool (or reel) 505a or 505b. For the embodiment of the invention illustrated in FIGS. 26 and 27, when the wire changers 208 retract their associated welding wire, the welding wire being retracted exits its respective associated conduit (e.g. either conduit 404a or conduit 404b) near its associated spool 505a or 505b and begins to loop downwardly into the accumulation zone 509a or 509b (see FIG. 26). Thus, the assembly of dereelers 500 of FIG. 26 differs from the barrel-type dereeler assembly 400 in that the latter assembly employs no containers (i.e. no containers 507a and 507b) because the barrels (i.e. wire barrel 400a and 400b) provide the same function in addition to providing housing for the spools (or reels) 414a and 414b.

With the barrel-type wire dereeler assembly 400 of FIG. 23, welding wire 16a or 16b returning to barrel 400a or 400b loops out until it contacts the insides of the associated barrel 400a or 400b. Some of the loop of welding wire 16a or 16b may fall into respective trough 412a or 412b. Eventually if enough welding wire 16 (i.e. welding wire 16a or 16b) is fed back to the associated wire barrel (i.e. wire barrel 400a or 400b), the welding wire 16 will wedge against the inside of its associated wire barrel and cause its associated sweep arm (i.e. sweep arm 406a or 406b) to rotate in a clockwise direction with respect to the top plan view in FIG. 23 for continually depositing welding wire 16 as long as it is being introduced into its associated wire barrel.

Referring now to FIGS. 31–33 there is seen a two-section wire changer 208 and a plurality of continuity detectors, generally illustrated as 710, being employed to detect ends of respective welding wires 16. Continuity detectors 710 are inputs for the control assembly 15 and operate akin to ohmmeters in that they utilize a small electrical current to sense conductivity between two terminals. The continuity detectors 710 are small devices which would typically be located in an enclosure and include timers, relays and other electrical components which are necessary to perform the tasks of wire detection, application of logic (to include timing functions) and signal output to other components of the welding system. In some automatic or robotic systems, existing enclosures would have sufficient space to mount the wire changer electrical control components.

As best shown in FIGS. 31 and 32, conduits 404a and 404b contain respective contact tubes 701a and 701b which support continuity detectors 710a and 710b respectively. Internally the continuity detectors 710a and 710b may have a relay or electronic switch (not shown) which turns on or off in the presence of conductivity which is used as the actual input for the control assembly 15. As long as welding wires 16a and 16b exists between the respective contact tubes 701a and 701b and the wire changer 208 the continuity detector 710a and 710b are turned on. When the end of the welding wires 16a and 16b respectively pass through contact tubes 701a and 701b electrical continuity is lost and the continuity detectors 710a and 710b are turned off, alerting the control assembly 15. The control assembly 15 will then initiate an orderly cessation of welding. Once welding ceases the operator can start the wire change process if the proper wire is available.

The continuity detectors 710a and 710b may additionally be disposed at any convenient location between the wire changer 208 and a contact plate 999 which is disposed in proximity to an end of a welding wire 16 (see FIG. 31). Thus, with respect to welding wire 16b, continuity detectors 710b may be placed in wire changer 208 and on the wire feeder 19, and the contact plate 99. When welding wire 16b passes past the continuity detector 710b on the wire feeder 19, the control assembly 15 causes the motor 54 of the wire feeder 19 to de-energize. Likewise, if the end of welding wire 16b passes by the continuity detector 710b on the wire changer 208, the reversible motor 200 of the wire changer 208 deenergizes to stop rotating the drive wheel 224. The reverse with respect to welding wire 16b would also be true. That is, if an end of welding wire 16b passes by the continuity detector 710b on the contact tube 701b, the reversible motor 200 on the wire changer 208 would de-energize to stop selectively feeding welding wire 16b to the wire feeder 19. In the latter situation, an end of welding wire 16b passing by the continuity detector 710b on the contact tube 701b would indicate that there is no more welding wire 16b on the spool associated therewith. The foregoing procedure would also be true with respect to welding wire 16a and the continuity detectors 710a associated with welding wire 16a.

The continuity detectors 710 may be any suitable type of sensors, such as that sold commercially under the trademark SAFE-PAK®, Part No. A22445, by Imo Industries Inc., One Cowles Rd., Planville, Conn. 06062. Mechanical switches, proximity switches, and photoswitches may also be utilized as wire detectors 710.

Continuing to refer now to the drawings for operation of the invention, during a welding procedure, the wire changer motor 200 is not operating and all pinch roller assemblies 204 are released and/or retracted. Assuming that welding wire 16a is being used for a welding procedure, welding wire 16a is pulled from spool 18a by the wire feeder 19 and is fed through the whip assembly 10 to the work-piece assembly 42. Welding wire 16b has been previously retracted out of the converging-zone assembly 720 of the aligning assembly 300 such that welding wire 16b will not interfere with the movement of welding wire 16a. Thus, during a welding procedure, the wire changer 208 has no active role per se.

Referring now to FIGS. 24 and 28–30 for describing the procedure for changing from welding wire 16a to 16b with the embodiment of the wire changer 208 shown in FIGS. 3A–3H being employed, the robot-type welding gun assembly 890 positions welding wire 16a between cutting blades 892a—892a of the wire trimmer 892. Subsequently, the end of welding wire 16a is trimmed by the cutting blades 829a—892a in order to remove any welding ball which resulted from a previous welding procedure. The wire feeder 19 is in a reverse mode of operation and commences to withdraw welding wire 16a from the whip assembly 10. As welding wire 16a is being withdrawn from the whip assembly 10, it is accumulating in wire barrel 400a, more specifically in trough 412a of the wire barrel 400a. When the trimmed end of welding wire 16a clears the last drive roll 104 of the wire feeder 19, motor 54 of the wire feeder 19 turns off and welding wire 16a stops moving. Subsequently, reversible motor 200 of wire changer 208 turns on in the reverse direction, and the pinch-roller assembly 204a is pivoted by the associated pneumatic cylinder assembly 212a to place welding wire 16a in a driving engagement with the drive wheel 224. This causes welding wire 16a to continue moving towards wire barrel 400a. When the end of welding wire 16a clears the converging-zone assembly 720 of the aligning assembly 300, reversible motor 200 is de-energized and pneumatic cylinder assembly 212a is deactivated and released, causing the associated pinch-roller assembly 204a to retract. Reversible motor 54 of the wire feeder 19 then turns on in the mode for feeding welding wire 16a through the whip assembly 10, and simultaneously therewith, reversible motor 200 of the wire changer 208 turns on in the forward direction. Pinch-roller assembly 204b is then caused to place welding wire 16b in a driving engagement with the drive wheel 224 through actuation of the pneumatic cylinder assembly 212b. This causes welding wire 16b to commence travelling forward. Welding wire 16b is propelled through the lead-end-zone assembly 724, through the converging-zone assembly 720 and through the inlet guide 102a of the inlet guide assembly 102 of the wire feeder 19. When the end of the welding wire 16b leaves the inlet guide 102a, it jams into the pinch point 1000 (see FIG. 33) defined by the first pair of pinch roll 25a/drive roll 104. The pinch roll 25a/drive roll 104 trap the end of welding wire 16b and begin pulling welding wire 16b to through the wire feeder 19. Pneumatic cylinder assembly 212b releases and causes pinch-roller assembly 204 to retract, and simultaneously therewith, reversible motor 200 is deenergized. Wire feeder 19 continues propelling welding wire 16b forward and through the whip assembly 10 until it exits the tip 3 (see FIG. 31) of the gun assembly.

Referring in detail now to FIGS. 31–33 for a further description of operation of an embodiment of the present invention where the embodiment of wire changers 208 in FIGS. 3A–3H is being employed, the robot-type welding gun assembly 890 positions the tip 3 such that welding wire 16a is trimmed for removing any welding ball. Wire feeder 19 turns on in the opposite direction for a specified period of time T1, adequate to ensure that the end of welding wire 16a is retracted through both pairs of drive rolls 104 pinch rolls 25a of the wire feeder 19, at which time wire feeder 19 stops. If the welding assembly is of the type which is employing spool-type dereelers with brakes as shown in FIGS. 26 and 27, brake assembly 506a would be applied when the motor 54 of the wire feeder 19 is turned on for moving welding wire 16a in the opposite direction, and brake assembly 506a would remain applied until welding wire 16a is to be used again. The wire changer 208 turns on in a reverse direction and actuates the pinch-roller assembly 204a. Welding wire 16a is retracted for a specified period of time T2 to ensure that the end of the welding wire 16a has cleared the lead-in-zone assembly 724 and the converging-zone 720 of the aligning assembly 300, whereupon motor 200 of the wire changer 208 is de-energized and stops, and pinch-roller assembly 204a is released from having placed welding wire 16a in a driving engagement with the drive wheel 224. Subsequently, reversible motors 54 and 200 of wire feeder 19 and the wire changer 208 respectively turn on such as to place the wire feeder 19 and the wire changer 208 in a position for moving welding wire forward to feed into the whip assembly 10. Pinch-roller assembly 204b is driven downwardly by pneumatic cylinder assembly 212b, causing welding wire 16b to be placed in driving engagement with the drive wheel 224 to commence propelling welding wire 16b forward, through the lead-in-zone assembly 724 and the converging-zone assembly 720 of the aligning assembly 300, into and through the inlet guide 102a and into the pinch point 1000 (see FIG. 33) created by the first pair of pinch roll 25a/drive roll 104 where the end of welding wire 16b is trapped for subsequently being fed forward. When welding wire 16b contacts inlet guide 102a, or alternatively, the first pair of pinch roll 25a/drive roll 104, continuity detectors 710b on the wire changer 208 and wire feeder 19 respectively turn on a timer which allows sufficient time T3 for the wire tip of the welding wire 16b to be engaged by the first pair of pinch roll 25a/drive roll 104. At the end of the time period T3, pneumatic cylinder assembly 212b is deactuated, causing the pinch roll assembly 204b of the wire changer 208 to pivot upwardly and release the welding wire 16b from a driving engagement with the drive wheel 224 and the motor 200 is deenergized and stops.

In a preferred embodiment of the inventions, wire changer 208 should have sufficient time to push a welding wire 16 into the pinch point 1000 of the wire feeder 19, thus ensuring that both pairs of pinch rolls 25a/drive rolls 104 grip and transport the welding wire 16. However, if the wire feeder 19 does not immediately accept the selected welding wire 16, then the selected welding wire 16 between the wire changer 208 and the wire feeder 19 may bend. Also, if the wire changer 208 has sufficient traction force, the selected welding wire 16 may buckle, creating a possible jam. It has been discovered that this problem may be minimized by reducing the pinch-roll force of the wire changer 208 so that the drive wheel 224 of the wire changer 208 will slip and disengage the selected welding wire 16 before the latter buckles. In other words, a particular pinch-roller assembly 204 is to place a particular welding wire 16 in a driving engagement with the drive wheel 224 where the driving engagement of the particular welding wire 16 with the drive wheel 224 will slip before the particular welding wire 16 buckles. Pinch-roll force of the wire changer 208 may be regulated by regulating the pneumatic air pressure which is being delivered to the pneumatic cylinder assemblies 212 or, for the preferred embodiment of the invention disclosed in FIGS. 4A–4H, by turning the appropriate adjusting nut (e.g., adjusting nut 608a or 608b or etc.) of the appropriate adjustable spring assembly (e.g. spring assembly 600a or 600b or etc.). Another reason for having the ability to regulate the pneumatic air pressure to the pneumatic cylinder assemblies 212, and for being able to adjust the spring force of the adjustable spring assemblies 600, is that if the wire feeder 19 immediately grips a particular welding wire 16, the wire feeder 19 will attempt to pull the welding wire 16 from the wire changer 208, and under extreme conditions, the selected welding wire 16 could be pulled apart and severed. Having a low pinch-roll force for the wire changer 208 allows the wire feeder 19 to drag the welding wire 16 from and/or through the engaged wire changer 208 without causing a problem. Thus, the ability to adjust the pinch-roll force of the wire changer 208 is an important feature with respect to properly causing the wire feeder 19 to engage and move a particularly selected welding wire 16. As a consequence, the time T3 may be increased to ensure that a particular welding wire 16 will be gripped by the appropriate first pair of pinch-roll 25a/drive roll 104 of the wire feeder 19. In a preferred embodiment of the invention, the pinch-roll force of the wire changer 208 would be adjusted such that the amount of traction was only slightly greater than necessary to transport a particularly selected welding wire 16 from a welding-wire source of supply (e.g., spool assembly 18 including the dereeler 44) to the wire feeder 19, or in a reverse direction, from the wire feeder 19 to the welding-wire source of supply, whichever is the greater.

The wire feeder 19 propels welding wire 16*b* forward until the welding wire 16*b* exits the tip 3 (see FIG. 31) and the end of the welding wire 16 contacts or strikes the contact plate 999 located below the cutting blades 892*a*—892*a* of the wire trimmer 892. The contact plate 999 is electrically conductive and is electrically isolated from ground. Continuity detector 710 at location 2 senses the wire touching of the contact plate 999 and sends a signal to the control assembly 15 which turns off the motor 54 of the wire feeder 19, and activates the trimmer 892, to subsequently cut the particular welding wire 16 to the proper length. In addition, the brake assembly 506*b* (see FIGS. 26 and 27) would be released if the welding system is using the spool-type dereelers as shown in FIGS. 26 and 27. As previously indicated, continuity detectors 710 are used to detect ends of respective welding wires 16. As long as a particular welding wire 16 exists between a contact tube, such as contact tubes 701*a* or 701*b*, and the wire changer 208, the continuity detector 710 (such as continuity detector 710*a* or 710*b*) is turned on. When an end of a particular welding wire 16 passes through the contact tube, such as contact tube 701*a* or 701*b*, electrical continuity is lost and continuity detectors 710 turn off, alerting the control assembly 15 which initiates an orderly cessation of the welding operation. Once the welding procedure ceases, the operator may start the wire change process with the wire changer 208 if the proper wire is available.

Thus, by the practice of this invention there is provided a method for selecting any one of a plurality of welding wires 16 comprising the steps of: (a) providing a wire changer assembly (e.g., wire changer 208) having a rotatable drive wheel (e.g., drive wheel 224), a first pinch-roller assembly (e.g., pinch-roller assembly 204*a*) having a first rotatable pinch roller (e.g., pinch-roller 220*a*) spaced from the rotatable drive wheel, and a second pinch-roller assembly (e.g., pinch-roller assembly 204*b*) having a second rotatable pinch roller (e.g., pinch-roller 220*b*) spaced from the rotatable drive wheel; (b) passing a first consumable welding wire (e.g., welding wire 16*a*) between the rotatable drive wheel and the first rotatable pinch roller of the first pinch-roller assembly; (c) passing a second consumable welding wire (e.g., welding wire 16*b*) between the rotatable drive wheel and the second rotatable pinch roller of the second pinch-roller assembly; and (d) pivoting the first pinch-roller assembly, causing the first rotatable pinch roller to engage and hold the first consumable welding wire in driving engagement with the rotatable drive wheel. Thus, by the further practice of this invention, there is also provided a method for selecting any one of a plurality of welding wires 16 comprising the steps of: (a) providing a wire changer assembly (e.g., wire changer 208) having a rotatable drive wheel (e.g., drive wheel 224), a first pinch-roller assembly (e.g., pinch-roller assembly 204*a*) having a first pinch-roller (e.g., pinch-roller 220*a*) and being biased for the first pinch roller engaging and holding a first consumable welding wire (e.g., welding wire 16*a*) in driving engagement with the drive wheel, and a second pinch-roller assembly (e.g., pinch-roller assembly 204*b*) having a second pinch roller (e.g., pinch-roller 220*b*) and being biased for the second pinch roller engaging and holding a second consumable welding wire (e.g., welding wire 16*b*) in driving engagement with the drive wheel; and (b) pivoting the second pinch-roller assembly, causing the second pinch roller to disengage and release the second consumable welding wire from driving engagement with the drive wheel and allowing the first consumable welding wire to be moved when the drive wheel is rotated.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope and spirit of the invention as set forth. Therefore, many modifications may be made to adapt a particular situation or material to the teachings of the invention without departing from the essential scope and spirit of the present invention. It is intended that the invention not be limited to the particular embodiment disclosed as the best mode contemplated for carrying out this invention, but that the invention will include all embodiments and equivalents falling within the scope of the appended claims.

What is claimed is:

1. An apparatus for selectively changing consumable welding wires, comprising:

a base;

a drive wheel rotatably secured to said base for engaging a consumable welding wire;

a pinch-roller arm pivotally secured to said base ;

a pinch roller rotatably secured to said pinch-roller arm for engaging the consumable welding wire; and a cylinder assembly, pivotally secured to said base, for moving said pinch-roller arm towards said base, causing the pinch roller to engage and hold the consumable welding wire in driving engagement with the drive wheel.

2. The apparatus of claim 1 additionally comprising a motor coupled to said drive wheel for rotating the drive wheel in a desired direction.

3. The apparatus of claim 1 additionally comprising a spring member supported by said base for biasing the pinch-roller arm away from the base.

4. The apparatus of claim 2 additionally comprising a spring member supported by said base for biasing the pinch-roller arm away from the base.

5. The apparatus of claim 3 wherein said base comprises a first shoulder pivotally secured to said pinch-roller arm and having a structure defining a base recess wherein said spring member lodges, and a second shoulder pivotally secured to said pneumatic cylinder assembly.

6. The apparatus of claim 4 wherein said base comprises a first shoulder pivotally secured to said pinch-roller arm and having a structure defining a base recess wherein said spring member lodges, and a second shoulder pivotally secured to said pneumatic cylinder assembly.

7. The apparatus of claim 5 wherein said first shoulder additionally includes a first bore and a first screw opening communicating with said first bore, and said second shoulder additionally includes a second bore and a second screw opening communicating with said second bore.

8. The apparatus of claim 1 wherein said cylinder assembly comprises a clevis having a clevis base, and a pair of clevis arms bound to the clevis base and pivotally secured to the base.

9. The apparatus of claim 7 wherein said cylinder assembly comprises a pneumatic cylinder assembly having a clevis including a clevis base having a clevis opening, a pair of clevis arms bound to the clevis base and pivotally secured to said second shoulder of said base, and a pneumatic cylinder supported by said clevis base and having a cylinder rod slidably passing through the clevis opening for removably engaging said pinch-roller arm.

10. The apparatus of claim 9 additionally comprising a first wire-guide conduit generally concentrically disposed in said first bore and a first set screw rotatably lodged in said first screw opening, and a second wire-guide conduit generally concentrically disposed in said second bore and a second set screw rotatably lodged in said second screw opening.

11. The apparatus of claim 10 wherein said pinch-roller arm comprises an arm lip; and said clevis arms are generally parallelly disposed with respect to each other such as to form a clevis slot therebetween; and said arm lip of said pinch-roller arm removably lodges within said clevis slot.

12. An apparatus for selectively changing consumable welding wires, comprising:
a base having a base cavity;
a drive wheel disposed in said base cavity and rotatably supported by said base for engaging a consumable welding wire;
a pinch-roller arm pivotally secured to said base;
a pinch roller rotatably secured to said pinch-roller arm for engaging the consumable welding wire;
a spring assembly supported by said base for biasing said pinch-roller arm towards said base, causing the pinch roller to engage and hold the consumable welding wire in driving engagement with the drive wheel; and
a cylinder assembly supported by said pinch-roller arm for moving said pinch-roller arm away from said base to cause said pinch roller to disengage and release the consumable welding wire from driving engagement with the drive wheel.

13. The apparatus of claim 12 additionally comprising a motor coupled to said drive wheel for rotating the drive wheel in a desired direction.

14. The apparatus of claim 12 wherein said spring assembly comprises a shaft pivotally connected to said base, a spring cup slidably disposed on said shaft, an adjusting nut threadably engaged to said shaft, and a spring member helically surrounding said shaft between said adjusting nut and said spring cup.

15. The apparatus of claim 13 wherein said spring assembly comprises a shaft pivotally connected to said base, a spring cup slidably disposed on said shaft, an adjusting nut threadably engaged to said shaft, and a spring member helically surrounding said shaft between said adjusting nut and said spring cup.

16. The apparatus of claim 12 wherein said pinch-roller arm has an arm opening, and said cylinder assembly comprises a pneumatic cylinder assembly having a cylinder rod retractably passing through said arm opening for retractably engaging said base.

17. The apparatus of claim 14 wherein said pinch-roller arm terminates in a bifurcated structure having a pair of arm forks wherebetween an arm slot is defined, and said shaft of said spring assembly is removably disposed within said arm slot.

18. The apparatus of claim 15 wherein said pinch-roller arm terminates in a bifurcated structure having a pair of arm forks wherebetween an arm slot is defined, and said shaft of said spring assembly is removably disposed within said arm slot.

19. The apparatus of claim 17 wherein each of said arm forks has a generally arcuate surface for engaging the spring cup to facilitate the sliding of said spring cup along said shaft and towards said adjusting nut for compressing said spring member between said spring cup and said adjusting nut.

20. The apparatus of claim 12 wherein said base comprises a first shoulder pivotally secured to said pinch-roller arm, and a second shoulder pivotally secured to said spring assembly.

21. The apparatus of claim 20 wherein said first shoulder additionally includes a first bore and a first screw opening communicating with said first bore, and said second shoulder additionally includes a second bore and a second screw opening communicating with said second bore.

22. The apparatus of claim 21 additionally comprising a first wire-guide conduit generally concentrically disposed in said first bore and a first set screw rotatably lodged in said first screw opening, and a second wire-guide conduit generally concentrically disposed in said second bore and a second set screw rotatably lodged in said second screw opening.

23. An apparatus for selecting a consumable welding wire from a plurality of consumable welding wires, comprising:
a base;
a drive wheel rotatably supported by said base for engaging a consumable welding wire;
a plurality of pinch-roller arms pivotally secured to said base;
a plurality of pinch rollers rotatably secured to said plurality of pinch-roller arms;
a plurality of spring assemblies supported by said base for biasing said plurality of pinch-roller arms; and
a plurality of cylinder assemblies engaging the base and the plurality of pinch-roller arms for moving the pinch-roller arms relative to the base.

24. The apparatus of claim 23 additionally comprising a motor coupled to said drive wheel for rotating the drive wheel in a desired direction.

25. The apparatus of claim 24 wherein said base includes a plurality of base recesses for housing said spring assemblies.

26. The apparatus of claim 24 wherein each of said spring assemblies comprises a shaft pivotally secured to said base, a spring cup slidably disposed on said shaft, an adjusting nut threadably engaged to said shaft, and a spring member helically surrounding said shaft between said adjusting nut and said spring cup.

27. The apparatus of claim 24 wherein each of said pinch-roller arms terminates in a bifurcated structure having a pair of arm forks wherebetween an arm slot is defined.

28. An apparatus for selecting and guiding any one of a plurality of consumable welding wires to a welding wire feeder assembly, comprising:
a first welding-wire source of supply having a first consumable welding wire;
a second welding-wire source of supply having a second consumable welding wire;
a wire changer assembly including a base, a drive wheel rotatably supported by said base for engaging the first consumable welding wire and the second consumable welding wire, a first pinch-roller arm pivotally secured to said base and having a first pinch roller rotatably secured thereto for engaging the first consumable welding wire, a second pinch-roller arm pivotally secured to said base and having a second pinch roller rotatably secured thereto for engaging the second consumable welding wire, a first spring assembly supported by said base for biasing the first pinch-roller arm, a second spring assembly supported by said base for biasing the second pinch-roller arm, a first cylinder releasably engaging said first pinch-roller arm for moving said first pinch-roller arm relative to said base to cause said first pinch roller to releasably engage the first consumable welding wire, a second cylinder releasably engaging said second pinch-roller arm for moving said second pinch-roller arm relative to said base to cause said second pinch roller to releasably engage the second consumable welding wire;

an aligning assembly slidably contacting said first consumable welding wire and said second consumable welding wire and capable of passing only one of said first consumable welding wire and said second consumable welding wire; and a welding wire feeder assembly supporting said aligning assembly for receiving only one of said first consumable welding wire and said second consumable welding wire.

29. The apparatus of claim 28 additionally comprising a welding gun assembly coupled to said welding wire feeder assembly, and said welding wire feeder assembly feeds only one of said first consumable welding wire and said second consumable welding wire to said welding gun assembly.

30. The apparatus of claim 28 wherein said aligning assembly comprises a funnel-shaped cone member having a cone opening for allowing passage of only one of said first consumable welding wire and said second consumable welding cone at a time.

31. The apparatus of claim 28 wherein said aligning assembly comprises a funnel-shaped cone member having a cone opening for allowing passage of only one of said first consumable welding wire and said second consumable welding wire at a time; a first conduit member coupled to said funnel-shaped cone member and having said first consumable welding wire slidably passing therethrough for entering the funnel-shaped cone member and for subsequently passing through the cone opening; and a second conduit member coupled to said funnel-shaped cone member and having said second consumable welding wire slidably passing therethrough for entering the funnel-shaped cone member and for subsequently passing through the cone opening.

32. The apparatus of claim 28 wherein said first welding-wire source of supply comprises a first reel stand; a first reel wound with said first consumable welding wire and rotatably supported by said first reel stand; a first brake assembly supported by said first reel stand for releasably engaging said first consumable welding wire wound on said first reel; and a first container coupled to said first reel stand and including a first container recess disposed under said first reel for providing a first zone for accumulating said first consumable welding wire when a direction of movement of the first consumable welding wire is towards said first reel.

33. A method for selecting any one of a plurality of consumable welding wires comprising the steps of:

(a) providing a wire changer assembly having a rotatable drive wheel, a first pinch-roller assembly having a first rotatable pinch roller spaced from said rotatable drive wheel, and a second pinch-roller assembly having a second rotatable pinch roller spaced from said rotatable drive wheel;

(b) passing a first consumable welding wire between the rotatable drive wheel and the first rotatable pinch roller of the first pinch-roller assembly;

(c) passing a second consumable welding wire between the rotatable drive wheel and the second rotatable pinch roller of the second pinch-roller assembly; and (d) pivoting the first pinch-roller assembly, causing the first rotatable pinch roller to engage and hold the first consumable welding wire in driving engagement with the rotatable drive wheel.

34. The method of claim 33 wherein said providing step (a) additionally comprises providing a first spring member for biasing said first pinch-roller assembly away from said rotatable drive wheel, and a second spring member for biasing said second pinch-roller assembly away from said rotatable drive wheel.

35. The method of claim 33 additionally comprising sensing when the first consumable welding wire contacts a contact plate and transmitting a signal to a control assembly which turns off a motor to a wire feeder and activates a trimmer to cut the first consumable welding wire.

36. A method for selecting any one of a plurality of consumable welding wires comprising the steps of:

(a) providing a wire changer assembly having a rotatable drive wheel, a first pinch-roller assembly having a first pinch roller and being biased for said first pinch roller engaging and holding a first consumable welding wire in driving engagement with said drive wheel, and a second pinch-roller assembly having a second pinch roller and being biased for said second pinch roller engaging and holding a second consumable welding wire in driving engagement with said drive wheel; and (b) pivoting the second pinch-roller assembly, causing the second pinch roller to disengage and release the second consumable welding wire from driving engagement with said drive wheel and allowing the first consumable welding wire to be moved when said drive wheel is rotated.

* * * * *